United States Patent
Chen et al.

(10) Patent No.: US 10,265,734 B2
(45) Date of Patent: Apr. 23, 2019

(54) WINDOW CLEANING ROBOT, WINDOW CLEANING ROBOT SYSTEM AND METHOD FOR CONTROLLING THE WINDOW CLEANING ROBOT

(71) Applicant: JIANGSU MIDEA CLEANING APPLIANCES CO., LTD., Jiangsu (CN)

(72) Inventors: Yuan Chen, Jiangsu (CN); Xiaogang Zhu, Jiangsu (CN); Xiaolong Yuan, Jiangsu (CN)

(73) Assignee: JIANGSU MIDEA CLEANING APPLIANCES CO., LTD., Suzhou, Jiangsu (CN)

( * ) Notice: Subject to any disclaimer, the term of this patent is extended or adjusted under 35 U.S.C. 154(b) by 168 days.

(21) Appl. No.: 15/238,642

(22) Filed: Aug. 16, 2016

(65) Prior Publication Data

US 2017/0232480 A1 Aug. 17, 2017

(30) Foreign Application Priority Data

Feb. 16, 2016 (CN) .......................... 2016 1 0087278
Feb. 16, 2016 (CN) ...................... 2016 2 0122871 U
(Continued)

(51) Int. Cl.
*B08B 1/00* (2006.01)
*A47L 1/02* (2006.01)
(Continued)

(52) U.S. Cl.
CPC ................ *B08B 1/006* (2013.01); *A47L 1/02* (2013.01); *G01P 5/00* (2013.01); *G05D 1/0214* (2013.01);
(Continued)

(58) Field of Classification Search
CPC .......... A47L 1/02; A47L 1/03; A47L 2201/04; G05D 1/0214; G05D 2201/0203; B08B 1/006; G01P 5/00; H04B 10/60
See application file for complete search history.

(56) References Cited

U.S. PATENT DOCUMENTS

2012/0018419 A1* 1/2012 Chan ..................... B29C 65/229
219/541
2015/0314444 A1* 11/2015 Tang ........................ A47L 1/02
700/245

FOREIGN PATENT DOCUMENTS

| CN | 205018960 U | 2/2016 |
| CN | 105640420 A | 6/2016 |

(Continued)

OTHER PUBLICATIONS

International Search Report with Written Opinion corresponding to International Patent Application No. PCT/CN2016/090950, dated Nov. 23, 2016—English Translation of the International Search Report Only.

(Continued)

*Primary Examiner* — Adam R Mott
(74) *Attorney, Agent, or Firm* — Lathrop Gage LLP

(57) ABSTRACT

A window cleaning robot (100), a window cleaning robot system and a method for controlling the window cleaning robot are disclosed. The window cleaning robot (100) comprises a window cleaning robot body (10), a detecting module disposed on the window cleaning robot body (10) and configured to detect an environment outside the window cleaning robot body (10), and a controlling device connected to the detecting module and configured to control an action of the window cleaning robot body (10) based on a data detected by the detecting module.

17 Claims, 15 Drawing Sheets

(30) Foreign Application Priority Data

Mar. 14, 2016 (CN) .......................... 2016 1 0142998
Mar. 14, 2016 (CN) ..................... 2016 2 0193400 U
Jul. 12, 2016 (CN) ..................... 2016 2 0726704 U

(51) Int. Cl.
*G05D 1/02* (2006.01)
*G01P 5/00* (2006.01)
*H04B 10/60* (2013.01)

(52) U.S. Cl.
CPC .. *A47L 2201/04* (2013.01); *G05D 2201/0203* (2013.01); *H04B 10/60* (2013.01)

(56) References Cited

FOREIGN PATENT DOCUMENTS

| | | | |
|---|---|---|---|
| CN | 105747984 | A | 7/2016 |
| CN | 205625792 | U | 10/2016 |
| CN | 205729238 | U | 11/2016 |
| CN | 102591337 | A | 7/2018 |
| DE | 102006037320 | A1 | 2/2008 |
| KR | 1020080068165 | A | 7/2008 |
| KR | 1020110031061 | A | 3/2011 |
| WO | WO 2016/011081 | A1 | 1/2016 |

OTHER PUBLICATIONS

Office action corresponding to Chinese Patent Application No. 201610087278.6, dated Aug. 18, 2017—Search Results on p. 8 Only.
Office action corresponding to European Patent Application No. 16184472.5, dated Jun. 29, 2017.
Chinese Patent Application No. 201610142998.8, English translation of Office Action dated Sep. 29, 2017, 9 pages.
Chinese Patent Application No. 201610142998.8, Office Action dated Sep. 29, 2017, 8 pages.

* cited by examiner

WINDOW CLEANING ROBOT, WINDOW CLEANING ROBOT SYSTEM AND METHOD FOR CONTROLLING THE WINDOW CLEANING ROBOT

CROSS-REFERENCE TO RELATED APPLICATION

This application claims priority to and benefits of Chinese Patent Application Serial No. 201610087278.6, filed with the State Intellectual Property Office of P. R. China on Feb. 16, 2016; Chinese Patent Application Serial No. 201620122871.5, filed with the State Intellectual Property Office of P. R. China on Feb. 16, 2016; Chinese Patent Application Serial No. 201610142998.8, filed with the State Intellectual Property Office of P. R. China on Mar. 14, 2016; Chinese Patent Application Serial No. 201620193400.3, filed with the State Intellectual Property Office of P. R. China on Mar. 14, 2016; Chinese Patent Application Serial No. 201620726704.1, filed with the State Intellectual Property Office of P. R. China on Jul. 12, 2016; the entire contents of which are incorporated herein by reference.

FIELD

The present disclosure relates to the field of household appliance, and more particularly to a window cleaning robot, a window cleaning robot system and a method for controlling the window cleaning robot.

BACKGROUND

A window cleaning robot in the related art is a product which may be used outdoors and whose operating situation may be adversely affected by a lower or higher ambient temperature. For example, the lower air temperature results in that the window cleaning robot is prone to slipping when it works because the moisture in the air is prone to forming ice or dew on the window to be cleaned, and the higher air temperature results in that the window cleaning robot is prone to falling off from the window to be cleaned because the suction of the window cleaning robot and the window to be cleaned is reduced due to the reduction of vacuum degree caused by the relatively thin air and the fan speed.

In addition, the window cleaning robot in the related art can not identify the weather. When the window cleaning robot works on the surface of the window to which the rain and snow adhere, not only slipping may occur between a walking portion and the window, such that the window cleaning robot is difficult to continue to walk, but also the window cleaning robot even falls off due to the reduced suction, which not only cause damage to the window cleaning robot, but also threaten the safety of pedestrians outside the window.

In the related art, the window cleaning robot is powered by a power adapter, that is, the power adapter converts an alternating current into a direct current so as to supply power to the window cleaning robot. However, a drawback is exist in the related art, i.e. the window cleaning robot is prone to falling off when the window cleaning robot works outdoors and encounters a sudden increased wind force, so there is a security risk.

Therefore, the related art needs to be improved.

SUMMARY

Embodiments of the present disclosure seek to solve at least one of the problems existing in the related art to at least some extent.

For this, according to a first aspect of the present disclosure, a window cleaning robot is provided which may execute different orders based on different conditions and has a higher security.

According to a second aspect of the present disclosure, a window cleaning robot system is provided.

According to a third aspect of the present disclosure, a method for controlling the window cleaning robot is provided.

The window cleaning robot according to embodiments of the first aspect of the present disclosure comprises: a window cleaning robot body; a detecting module disposed on the window cleaning robot body and configured to detect an environment outside the window cleaning robot body; and a controlling device connected to the detecting module and configured to control an action of the window cleaning robot body based on a data detected by the detecting module.

The window cleaning robot according to an embodiment of the present disclosure may improve the user experience and increase the service security by providing the detecting module thereon for detecting the environment outside the window cleaning robot body and a controlling device for controlling the action of the window cleaning robot body based on the data detected by the detecting module.

In addition, the window cleaning robot according to above embodiment of the present disclosure may further have additional technical features as follows.

In an embodiment of the present disclosure, the detecting module is a wind speed detecting module for detecting the outdoor wind force, and the window cleaning robot body further comprises a power adapter for converting an alternating current into a direct current so as to supply power to the window cleaning robot body, the wind speed detecting module is connected in series between the window cleaning robot body and the power adapter, and the window cleaning robot body executes a safety controlling strategy to return to a default security area when the outdoor wind force is greater than a default wind force.

With the window cleaning robot according to an embodiment of the present disclosure, the wind speed detecting module for detecting the outdoor wind force is connected in series between the window cleaning robot body and the power adapter, when the outdoor wind force is greater than the default wind force, the window cleaning robot body executes a safety controlling strategy to return to a default security area. This may thus protect the window cleaning robot from falling off when the outdoor wind force increases, thereby increasing the service security and improving the user experience.

In an embodiment of the present disclosure, the wind speed detecting module is detachable connected to the window cleaning robot body, and/or the wind speed detecting module is detachable connected to the power adapter.

In an embodiment of the present disclosure, the wind speed detecting module comprises: a first base; a first wind speed sensor for detecting the outdoor wind force which is disposed on the first base; a first power supply circuit connected in series between the window cleaning robot body and the power adapter so as to enable the power adapter to supply power to the window cleaning robot body by means of the first power supply circuit; and a first signal processor disposed within the first base and connected to the first wind speed sensor, and configured to control to disconnect the first power supply circuit so as to enable the window cleaning robot body to enter into a power-off mode when the outdoor wind force is greater than the default wind force.

In an embodiment of the present disclosure, the window cleaning robot body comprises a power supply battery which supplies power to the window cleaning robot body so as to enable the window cleaning robot body to return to the default security area when the window cleaning robot body is in the power-off mode.

In an embodiment of the present disclosure, the wind speed detecting module comprises: a second base; a second wind speed sensor for detecting the outdoor wind force which is disposed on the second base; a second power supply circuit connected in series between the window cleaning robot body and the power adapter so as to enable the power adapter to supply power to the window cleaning robot body by means of the second power supply circuit; a signal transmitting component; and a second signal processor disposed within the second base and connected to the second wind speed sensor and the signal transmitting component, respectively, and configured to control the signal transmitting component to send a protecting signal to the window cleaning robot body when the outdoor wind force is greater than the default wind force.

In an embodiment of the present disclosure, the window cleaning robot body comprises: a signal receiving component configured to receive the protecting signal sent out by the wind speed detecting module; and a controller connected to the signal receiving component and configured to control the window cleaning robot body to return to the default security area when the signal receiving component receives the protecting signal.

In an embodiment of the present disclosure, the signal transmitting component comprises a first wireless communication unit, and the signal receiving component comprises a second wireless communication unit which communicates with the first wireless communication unit.

In an embodiment of the present disclosure, the first wireless communication unit is an infrared transmitter, and the second wireless communication unit is an infrared receiver.

In an embodiment of the present disclosure, the detecting module is a temperature detecting device, and the temperature detecting device is disposed on the window cleaning robot body and configured to detect a temperature outside the window cleaning robot body.

The window cleaning robot according to the present disclosure may detect real-timely the air temperature near the surface of the window to be cleaned by installing the temperature detecting device, and the controlling device may control the window cleaning robot body to take a corresponding action. This improves the service security of the window cleaning robot when the air temperature detected by the temperature detecting device is higher or lower than a default value.

In an embodiment of the present disclosure, the controlling device is disposed within the window cleaning robot body, and the temperature detecting device comprises: a probe configured to detect the temperature outside the window cleaning robot body, at least a part of the probe being outside the window cleaning robot body; and a conducting wire having one end connected to the probe and the other end connected to the controlling device.

In an embodiment of the present disclosure, the window cleaning robot body is provided with a mounting slot on a bottom wall thereof, the probe is mounted within the mounting slot, one end of the conducting wire is disposed within the mounting slot so as to connect to the probe, and the other end of the conducting wire passes through the mounting slot so as to connect to the controlling device.

In an embodiment of the present disclosure, the temperature detecting device is fixed within the mounting slot by means of a fixing component.

In an embodiment of the present disclosure, the fixing component comprises a fixed cover and a fastener configured to fasten the connecting portion to the mounting slot. The fixed cover comprises a receiving portion and a connecting portion which are connected with each other, and the probe is accommodated between the receiving portion and a top wall of the mounting slot.

In an embodiment of the present disclosure, the receiving portion is configured to be semicylindrical, and there are two connecting portions which are connected to the receiving portion on both sides in a radial direction respectively.

In an embodiment of the present disclosure, the mounting slot is provided with a supporting rib on a top wall thereof, and the probe is supported on the supporting rib.

In an embodiment of the present disclosure, the supporting rib is formed with a positioning slot, and a part of the probe is accommodated and positioned within the positioning slot.

In an embodiment of the present disclosure, there are a plurality of supporting ribs, and the plurality of supporting ribs are spaced apart in a length direction of the probe so as to support the probe, respectively.

In an embodiment of the present disclosure, the window cleaning robot body comprises a casing formed with a suction inlet on a bottom wall thereof; a window cleaning component disposed on the bottom wall and configured to surround the suction inlet; and a fan disposed within the casing and connected to the controlling device, and configured to be controlled by the controlling device to withdraw the air from a chamber defined by the window cleaning component, the bottom wall together with a window to be cleaned through the suction inlet, so as to enable the window cleaning robot body to adhere to the window to be cleaned.

In an embodiment of the present disclosure, the window cleaning robot body comprises a casing and a walking device, the walking device is disposed on the casing and connected to the controlling device, and configured to be controlled by the controlling device to drive the casing to walk on a window to be cleaned.

In an embodiment of the present disclosure, the window cleaning robot body comprises a casing and an alarming device, the alarming device is disposed on the casing and connected to the controlling device, and configured to be controlled by the controlling device to send an alarm.

In an embodiment of the present disclosure, the window cleaning robot body comprises a casing and an air conditioning device, the air conditioning device is disposed on the casing and connected to the controlling device, and configured to be controlled by the controlling device to adjust a temperature of a surface to be cleaned of a window to be cleaned.

In an embodiment of the present disclosure, the detecting module is a snow and rain sensor, the snow and rain sensor is disposed in the window cleaning robot body and has a sensing surface exposed to an outside part of the window cleaning robot body, and the sensing surface is configured to detect whether snow or rain is present thereon and produce a sensing signal; the controlling device is a circuit board, and the circuit board is disposed in the window cleaning robot body and connected to the snow and rain sensor, and receives the sensing signal of the snow and rain sensor and controls the action of the window cleaning robot body based on the sensing signal.

With the window cleaning robot according to the present disclosure, the circuit board can receive the sensing signal sent out by the snow and rain sensor and control the window cleaning robot body to take an appropriate action, thereby realizing an automatic operation of the window cleaning robot, improving the intelligent level of the window cleaning robot, reducing troubles the user encountered, and protecting the window cleaning robot without manual operation, thereby not only protecting the property safeties of users, but also avoiding the harm to a pedestrian outside the window by preventing the window cleaning robot from falling off.

In an embodiment of the present disclosure, the window cleaning robot body comprises a base and an upper casing, the base together with the upper casing define a receiving chamber, the snow and rain sensor is disposed in the receiving chamber, and the upper casing has an opening from which the sensing surface is exposed.

In an embodiment of the present disclosure, the sensing surface is level with an upper surface of the upper casing.

In an embodiment of the present disclosure, the base is provided with a sensor mounting column, and the snow and rain sensor is connected to the sensor mounting column and is mounted on the base through the sensor mounting column.

In an embodiment of the present disclosure, the snow and rain sensor is provided with a mounting base, the mounting base is provided with a screw hole, and the snow and rain sensor is mounted on the mounting column through screw hole.

In an embodiment of the present disclosure, the base is provided with a plurality of supporting columns, the circuit board is mounted on the base through the supporting columns.

In an embodiment of the present disclosure, the circuit board is adjacent to the snow and rain sensor.

In an embodiment of the present disclosure, the snow and rain sensor is connected to the circuit board through a cable.

In an embodiment of the present disclosure, the sensing surface is configured as a grid electrode.

The window cleaning robot according to an embodiment of the present disclosure comprises a signal receiving component configured to communicate with a wind speed detecting module, so as to receive a protecting signal sent out by the wind speed detecting module when the outdoor wind force is greater than a default wind force; and a controller connected to the signal receiving component and configured to control the window cleaning robot to execute a safety controlling strategy so as to return to a default security area when the signal receiving component receives the protecting signal.

In an embodiment of the present disclosure, the signal receiving component comprises a second wireless communication unit which communicates with a first wireless communication unit of the wind speed detecting module.

In an embodiment of the present disclosure, the first wireless communication unit is an infrared transmitter, and the second wireless communication unit is an infrared receiver.

The window cleaning robot system according to embodiments of the second aspect of the present disclosure comprises a window cleaning robot and a wind speed detecting module, wherein the wind speed detecting module communicating with the window cleaning robot is configured to detect the outdoor wind force and produce a protecting signal when the outdoor wind force is greater than a default wind force and send the protecting signal to the window cleaning robot; and the window cleaning robot executes a safety controlling strategy to return to a default security area after receiving the protecting signal.

In an embodiment of the present disclosure, the wind speed detecting module comprises a base; a wind speed sensor for detecting the outdoor wind force which is disposed on the base; a signal transmitting component; and a signal processor disposed within the base and connected to the wind speed sensor and the signal transmitting component respectively, and configured to control the signal transmitting component to send the protecting signal when the outdoor wind force is greater than the default wind force.

In an embodiment of the present disclosure, the window cleaning robot comprises: a signal receiving component for receiving the protecting signal sent out by the wind speed detecting module; and a controller connected to the signal receiving component and configured to control the window cleaning robot to execute the safety controlling strategy so as to return to the default security area when the signal receiving component receives the protecting signal.

In an embodiment of the present disclosure, the signal transmitting component comprises a first wireless communication unit, and the signal receiving component comprises a second wireless communication unit which communicates with the first wireless communication unit.

In an embodiment of the present disclosure, the first wireless communication unit is an infrared transmitter, and the second wireless communication unit is an infrared receiver.

The method for controlling a window cleaning robot according to embodiments of the third aspect of the present disclosure comprises the following steps: detecting the outdoor wind force by the wind speed detecting module; and executing the safety controlling strategy by the window cleaning robot so as to return to the default security area when the outdoor wind force is greater than the default wind force.

In an embodiment of the present disclosure, the step of executing the safety controlling strategy by the window cleaning robot so as to return to the default security area when the outdoor wind force is greater than the default wind force comprises controlling to disconnect the power supply circuit of the window cleaning robot by the wind speed detecting module so as to enable the window cleaning robot to enter into the power-off mode when the outdoor wind force is greater than the default wind force; and enabling the window cleaning robot to return to the default security area under the power-off mode.

In an embodiment of the present disclosure, the step of executing the safety controlling strategy by the window cleaning robot so as to return to the default security area when the outdoor wind force is greater than the default wind force comprises controlling to send the protecting signal to the window cleaning robot by the wind speed detecting module when the outdoor wind force is greater than the default wind force; and enabling the window cleaning robot to return to the default security area after receiving the protecting signal.

The method for controlling the window cleaning robot according to embodiments of the present disclosure comprises the following steps detecting real-timely a temperature outside the window cleaning robot body by the temperature detecting device; and controlling the window cleaning robot body to execute a corresponding action by the controlling device based on the temperature detected real-timely by the temperature detecting device.

In an embodiment of the present disclosure, controlling the window cleaning robot body to execute the corresponding action specifically is at least one of controlling the window cleaning robot body to send an alarm;

controlling to reduce a walking speed of the window cleaning robot body;

controlling to increase suction of the window cleaning robot body and a window to be cleaned; and adjusting a temperature of a surface to be cleaned of the window to be cleaned.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

Figure 1:
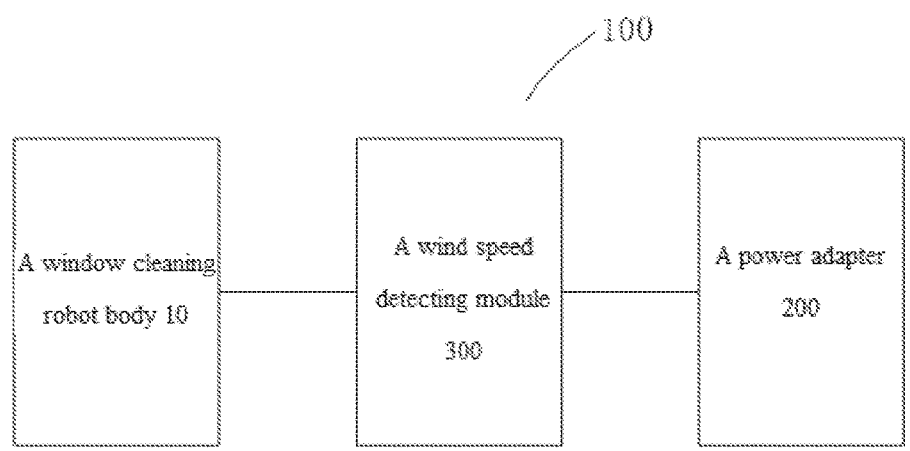
FIG. 1 is a block schematic view of a window cleaning robot according to an embodiment of the present disclosure.
Figure 2:
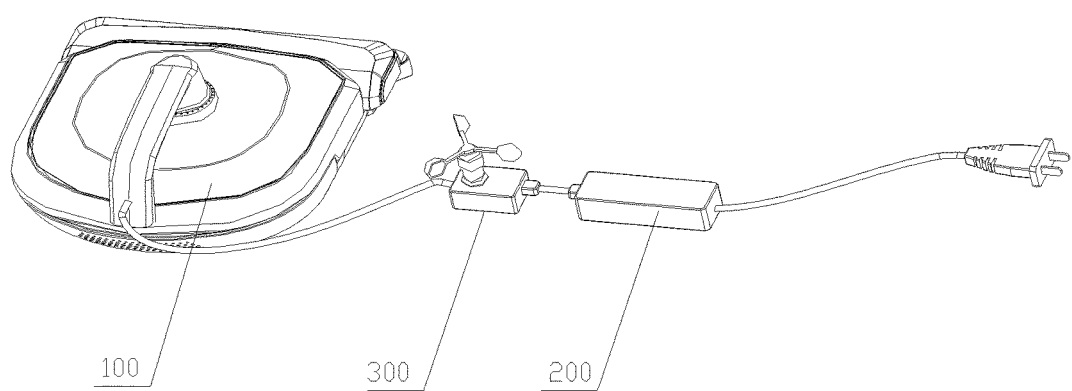
FIG. 2 is a structure schematic view of a window cleaning robot according to a specific embodiment of the present disclosure.
Figure 3:
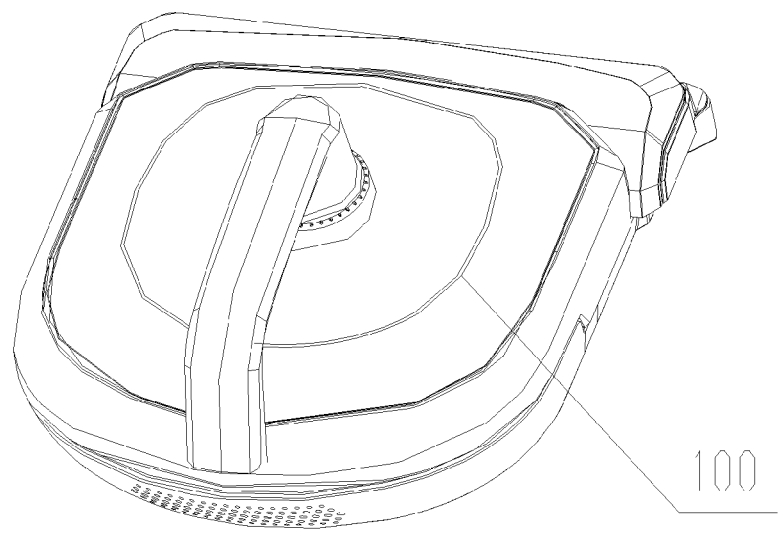
FIG. 3 is an enlarged schematic view of the window cleaning robot shown in FIG. 2.

REFERENCE NUMERALS window cleaning robot 100; window cleaning robot body 10; power adapter 200 and wind speed detecting module 300; first base 301; first wind speed sensor 302; first power supply circuit 303; first signal processor 304 and power supply battery 101; second base 305; second wind speed sensor 306; second power supply circuit 307; signal transmitting component 308; second signal processor 309; signal receiving component 102 and controller 103;

window cleaning robot system 50; window cleaning robot 500 and wind speed detecting module 600; base 601; wind speed sensor 602; signal transmitting component 603 and signal processor 604; signal receiving component 502 and controller 503;

casing 1; bottom wall 110; mounting slot 111; via hole 111a; supporting rib 112; positioning slot 113; suction inlet 114;

temperature detecting device 2; probe 201; conducting wire 202;

fixed cover 31; receiving portion 311; connecting portion 312; mounting hole 313; fastener 32;

fan 2; walking device 3; controlling device 4;

body 10; upper casing 11; base 12; mounting column 121; supporting column 122;

snow and rain sensor 20; sensing surface 21; mounting base 22; screw hole 23; cable 24; grid electrode 25; screw 26;

circuit board 30.

DETAILED DESCRIPTION

Reference will be made in detail to embodiments of the present disclosure. The same or similar elements and the elements having same or similar functions are denoted by like reference numerals throughout the descriptions. The embodiments described herein with reference to drawings are explanatory, illustrative, and used to generally understand the present disclosure, shall not be construed to limit the present disclosure.

A window cleaning robot 100 according to an embodiment of the present disclosure comprises a window cleaning robot body 10, a detecting module and a controlling device. Specifically the detecting module is disposed on the window cleaning robot body 10 and configured to detect an environment outside the window cleaning robot body 10, and the controlling device is connected to the detecting module and configured to control an action of the window cleaning robot body 10 based on a data detected by the detecting module.

The window cleaning robot 100 according to an embodiment of the present disclosure may improve the user experience and increase the service security by providing the detecting module on the window cleaning robot body 10 for detecting the environment outside the window cleaning robot body and a controlling device for controlling the action of the window cleaning robot body 10 based on the data detected by the detecting module.

Firstly, the window cleaning robot, a window cleaning robot system, and a method for controlling the window cleaning robot provided according to a first embodiment of the present disclosure will be described in detail in the following with reference to drawings. In this embodiment, the detecting module is a wind speed detecting module for detecting the outdoor wind force.

FIG. 1 is a block schematic view of a window cleaning robot according to an embodiment of the present disclosure. As shown in FIGS. 1-4 and FIGS. 6-8, the window cleaning robot 100 comprises the window cleaning robot body 10, a power adapter 200 and the wind speed detecting module 300.

The power adapter 200 is configured to convert an alternating current into a direct current so as to supply power to the window cleaning robot body 10; the wind speed detecting module 300 is configured to detect the outdoor wind force, and connected in series between the window cleaning robot body 10 and the power adapter 20, that is, one end of the wind speed detecting module 300 may be connected to the window cleaning robot body 10 through a first cable, and the other end of the wind speed detecting module 300 may be connected to the power adapter 20 through a second cable. The window cleaning robot body 10 executes a safety controlling strategy to return to a default security area when the outdoor wind force is greater than a default wind force. Specifically when the window cleaning robot works outdoors, the wind speed detecting module 300 may detect real-timely the outdoor wind force, and the window cleaning robot body 10 immediately executes the safety controlling strategy to return to the default security area in case that the outdoor wind force detected real-timely by the wind speed detecting module 300 is greater than the default wind force, for example, the outdoor wind is stronger than 5 grade wind; or the window cleaning robot body 10 continues to work in case that the outdoor wind force detected real-timely by the wind speed detecting module 300 is below or equal to the default wind force.

Therefore, the window cleaning robot 100 provided in embodiments of the present disclosure executes the safety controlling strategy to return to the default security area when the outdoor wind force is greater than the default wind force, which may thus protect the window cleaning robot from falling off when the outdoor wind force increases, thereby increasing the service security and improving the user experience.

According to an embodiment of the present disclosure, the wind speed detecting module 300 is detachable connected to the window cleaning robot body 10, and/or the wind speed detecting module 300 is detachable connected to the power adapter 200. That is, the wind speed detecting module 300 may be optionally installed, i.e. the wind speed detecting module 300 may be connected in series between the window cleaning robot body 10 and the power adapter 200 if needed, for example when the window cleaning robot 100 works outdoors, and the wind speed detecting module 300 may be removed if it is not needed, for example when the window cleaning robot body 10 is directly connected to the power adapter 200.

Two specific embodiments of the wind speed detecting module 300 will be described in the following with reference to FIGS. 4-5 and FIGS. 7-9.

Figure 4:
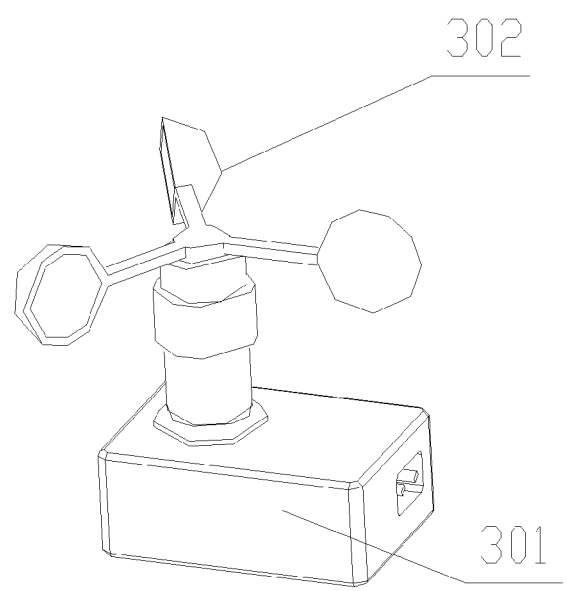
FIG. 4 is an enlarged schematic view of the wind speed detecting module of the window cleaning robot shown in FIG. 2.
Figure 5:
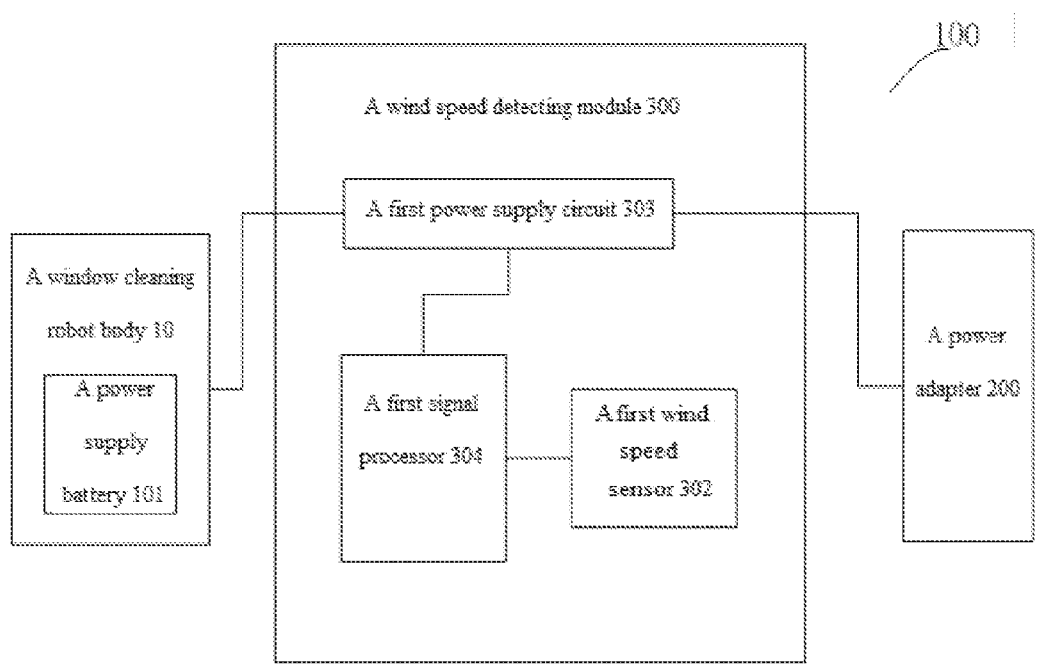
FIG. 5 is a block schematic view of a window cleaning robot according to a specific embodiment of the present disclosure.
Figure 6:
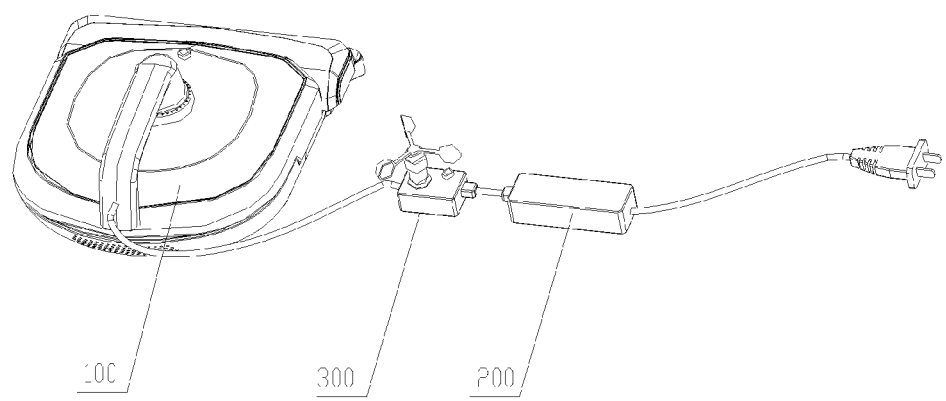
FIG. 6 is a structure schematic view of a window cleaning robot according to another specific embodiment of the present disclosure.

According to a specific embodiment of the present disclosure, as shown in FIG. 4 and FIG. 5, the wind speed detecting module 300 comprises a first base 301, a first wind speed sensor 302, a first power supply circuit 303 and a first signal processor 304.

The first wind speed sensor 302 which is disposed on the first base 301 is configured to detect the outdoor wind force; the first power supply circuit 303 is connected in series between the window cleaning robot body 10 and the power adapter 200 so as to enable the power adapter 200 to supply power to the window cleaning robot body 10 by means of the first power supply circuit 303; and the first signal processor 304 is disposed within the first base 301 and connected to the first wind speed sensor 302, and configured to control to disconnect the first power supply circuit 303 so as to enable the window cleaning robot body 10 to enter into a power-off mode when the outdoor wind force is greater than the default wind force.

Further, as shown in FIG. 5, the window cleaning robot body 10 comprises a power supply battery 101 which supplies power to the window cleaning robot body 10 so as to enable the window cleaning robot body 10 to return to the default security area when the window cleaning robot body 10 is in the power-off mode.

Specifically the wind speed detecting module 300 is connected in series between the window cleaning robot body 10 and the power adapter 200, and the power adapter 200 may convert the alternating current into the direct current and supply to the window cleaning robot body 10 through the first power supply circuit 303.

When the window cleaning robot works outdoors, the first wind speed sensor 302 may directly detect the outdoor wind force, generate an electrical signal according to the detected outdoor wind force and send the electrical signal to the first signal processor 304; and the first signal processor 304 processes and analyzes the electrical signal once receiving it so as to produce an analysis result, and controls the first power supply circuit 303 to be connected or disconnected based on the analysis result.

When the outdoor wind force detected by the first wind speed sensor 302 is greater than the default wind force, the first signal processor 304 determines whether the electrical signal sent out by the first wind speed sensor 302 meets a default protecting condition that, for example, a voltage value of the electrical signal is greater than a default voltage value, if it meets the default protecting condition, the first signal processor 304 immediately controls the first power supply circuit 303 to be disconnected so as to enable the window cleaning robot body 10 to enter into the power-off mode.

When entering into the power-off mode, the window cleaning robot body 10 such as the controller of the window cleaning robot body 10 starts using its own power supply battery 101 and automatically returns to the default security area in accordance with the safety controlling strategy, thereby protecting the window cleaning robot from falling off.

Figure 8:
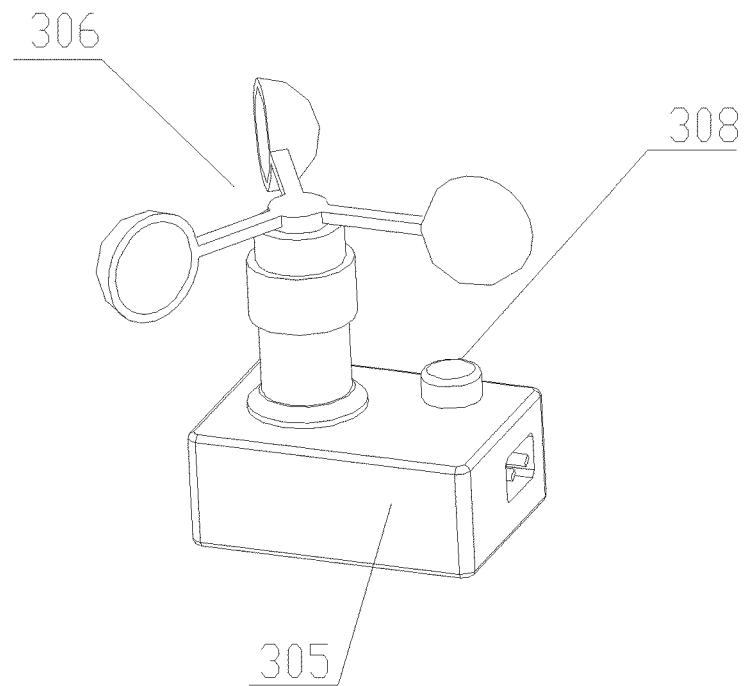
FIG. 8 is an enlarged schematic view of the wind speed detecting module of the window cleaning robot shown in FIG. 6.
Figure 9:
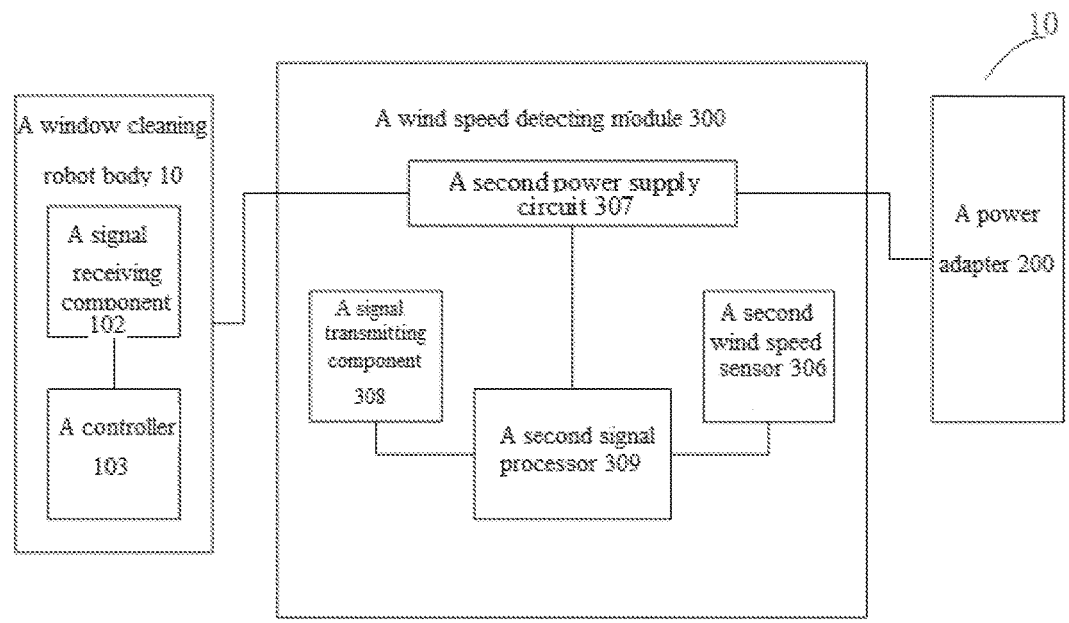
FIG. 9 is a block schematic view of a window cleaning robot according to another specific embodiment of the present disclosure.

According to the other specific embodiment of the present disclosure, as shown in FIGS. 8-9, the wind speed detecting module 300 comprises a second base 305, a second wind speed sensor 306, a second power supply circuit 307, a signal transmitting component 308, and a second signal processor 309.

The second wind speed sensor 306 which is disposed on the second base 305 is configured to detect the outdoor wind force. The second power supply circuit 307 is connected in series between the window cleaning robot body 10 and the power adapter 200 so as to enable the power adapter 200 to supply power to the window cleaning robot body 10 by means of the second power supply circuit 307. The second signal processor 309 is disposed within the second base 305 and connected to the second wind speed sensor 306 and the signal transmitting component 308, respectively, and configured to control the signal transmitting component 308 to send a protecting signal to the window cleaning robot body 10 when the outdoor wind force is greater than the default wind force.

Figure 7:
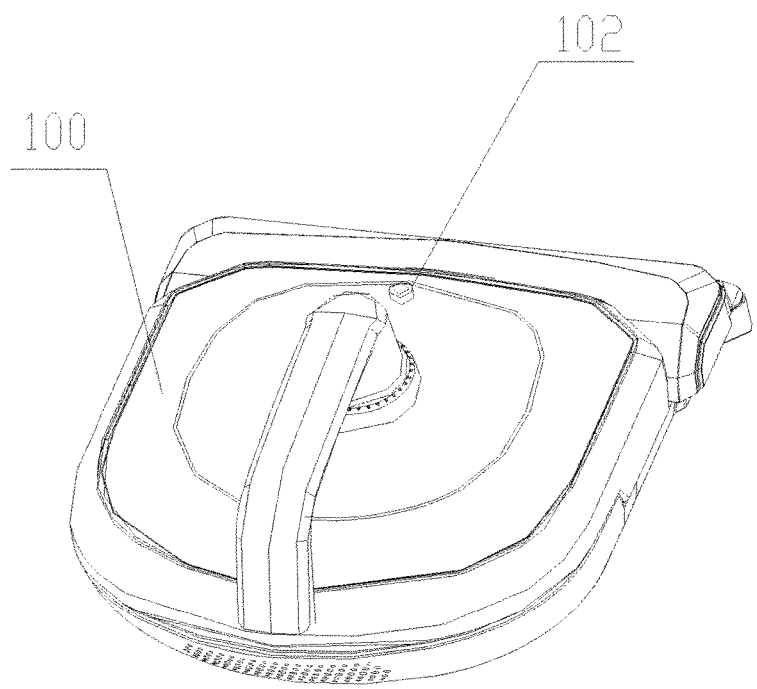
FIG. 7 is an enlarged schematic view of the window cleaning robot shown in FIG. 6.

Further, as shown in FIG. 7 and FIG. 9, the window cleaning robot body 10 comprises a signal receiving component 102 and a controller 103.

The signal receiving component 102 is configured to receive the protecting signal sent out by the wind speed detecting module 300. The controller 103 is connected to the signal receiving component 102 and configured to control the window cleaning robot body 10 to return to the default security area when the signal receiving component 102 receives the protecting signal.

Specifically the wind speed detecting module 300 is connected in series between the window cleaning robot body 10 and the power adapter 200, and the power adapter 200 may convert the alternating current into the direct current and supply to the window cleaning robot body 10 through the second power supply circuit 307.

When the window cleaning robot works outdoors, the second wind speed sensor 306 may directly detect the outdoor wind force, generate an electrical signal according to the detected outdoor wind force and send the electrical signal to the second signal processor 309; and the second signal processor 309 processes and analyzes the electrical signal once receiving it so as to produce an analysis result, and controls the signal transmitting component 308 based on the analysis result.

When the outdoor wind force detected by the second wind speed sensor 306 is greater than the default wind force, the second signal processor 309 determines whether the electrical signal sent out by the second wind speed sensor 306 meets the default protecting condition that, for example, the voltage value of the electrical signal is greater than the default voltage value, if it meets the default protecting condition, the second signal processor 309 immediately controls the signal transmitting component 308 to send out the protecting signal, such as an infrared signal with default frequency. When the signal receiving component 102 of the window cleaning robot body 10 receives the protecting signal, the controller 103 determines whether the outdoor wind force at this time is greater than the default wind force, if it is, the controller 103 starts using the safety controlling strategy in accordance with a default program, so as to enable the window cleaning robot body 10 to return to the default security area, thereby protecting the window cleaning robot from falling off. Moreover, the window cleaning robot is running on battery power during returning to the default security area, thus the security is higher.

In a specific embodiment of the present disclosure, the signal transmitting component 308 may comprise a first wireless communication unit, and the signal receiving component 102 may comprise a second wireless communication unit which communicates with the first wireless communication unit. Thus, the signal transmitting component 308 sends the protecting signal to the signal receiving component 102 by wireless communication with the signal receiving component 102.

More specific, the first wireless communication unit may be an infrared transmitter, and the second wireless communication unit may be an infrared receiver, that is, when the outdoor wind force detected by the second wind speed sensor 306 is greater than the default wind force, the second signal processor 309 controls the infrared transmitter to send out the infrared signal with default frequency, and the controller 103 starts using the safety controlling strategy (i.e. a default software program) to control the window cleaning robot body 10 to return to the default security area after the infrared receiver receives the infrared signal with default frequency.

In summary, with the window cleaning robot according to an embodiment of the present disclosure, the wind speed detecting module for detecting the outdoor wind force is connected in series between the window cleaning robot body and the power adapter, when the outdoor wind force is greater than the default wind force, and the window cleaning robot body executes the safety controlling strategy to return to the default security area so as to protect the window cleaning robot from falling off when the outdoor wind force increases, thereby increasing the service security and improving the user experience.

Figure 10:
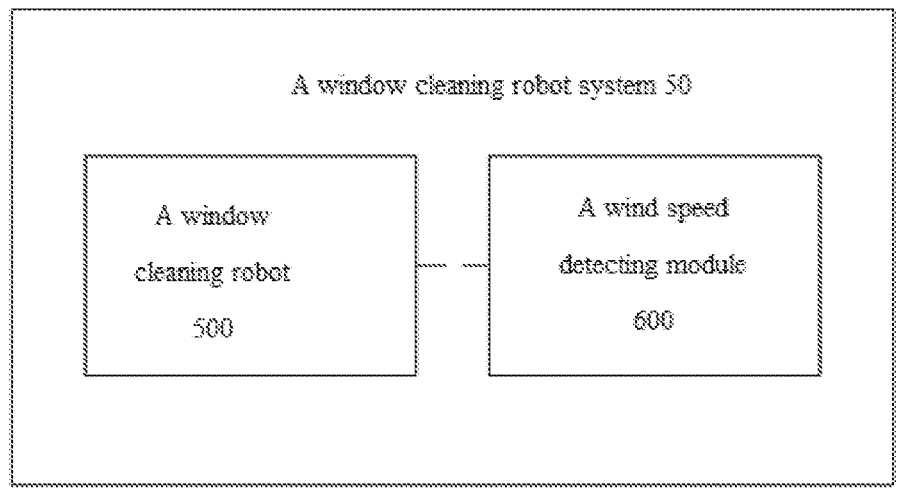
FIG. 10 is a block schematic view of a window cleaning robot system according to an embodiment of the present disclosure.

FIG. 10 is a block schematic view of a window cleaning robot system according to an embodiment of the present disclosure. As shown in FIG. 10, the window cleaning robot system 50 comprises a window cleaning robot 500 and a wind speed detecting module 600. According to a specific embodiment of the present disclosure, the wind speed detecting module 600 may be disposed on the window cleaning robot 500.

The wind speed detecting module 600 communicates with the window cleaning robot 500, is configured to detect the outdoor wind force and produce a protecting signal when the outdoor wind force is greater than the default wind force and send the protecting signal to the window cleaning robot 500. The window cleaning robot 50 executes the safety controlling strategy to return to the default security area after receiving the protecting signal.

Specifically when the window cleaning robot 500 works outdoors, the wind speed detecting module 600 disposed thereon may detect real-timely the outdoor wind force. When the outdoor wind force detected real-timely by the wind speed detecting module 600 is greater than the default wind force, for example, the outdoor wind is stronger than 5 grade wind, the wind speed detecting module 600 sends out the protecting signal to the window cleaning robot 500, and the window cleaning robot 500 immediately executes the safety controlling strategy to return to the default security area after receiving the protecting signal. When the outdoor wind force detected real-timely by the wind speed detecting module 600 is below or equal to the default wind force, the window cleaning robot 500 continues to work.

Therefore, the window cleaning robot system provided according to embodiments of the present disclosure executes the safety controlling strategy to return to the default security area when the outdoor wind force is greater than the default wind force so as to protect the window cleaning robot from falling off when the outdoor wind force increases, thereby increasing the service security and improving the user experience.

Figure 11:
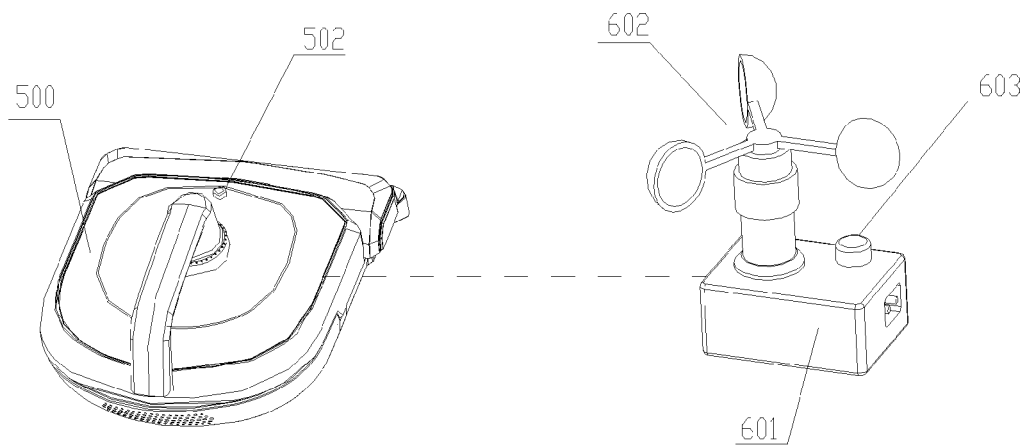
FIG. 11 is a structure schematic view of a window cleaning robot system according to a specific embodiment of the present disclosure.
Figure 12:
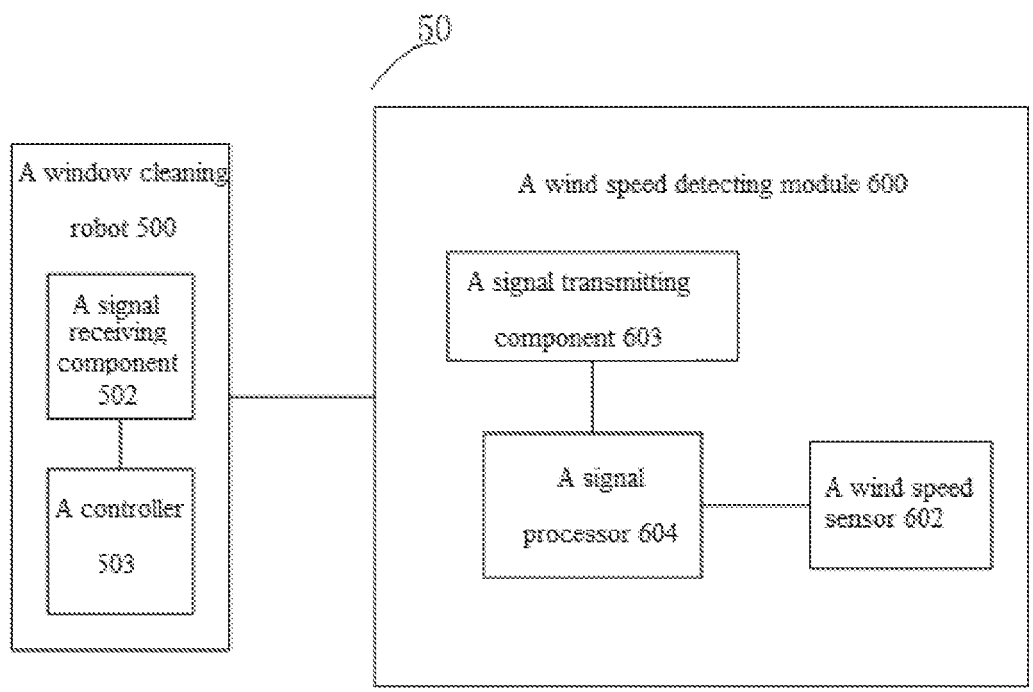
FIG. 12 is a block schematic view of a window cleaning robot system according to a specific embodiment of the present disclosure.

In an embodiment of the present disclosure, as shown in FIGS. 11-12, the wind speed detecting module 600 comprises a base 601, a wind speed sensor 602, a signal transmitting component 603, and a signal processor 604.

The wind speed sensor 602 which is disposed on the base 601 is configured to detect the outdoor wind force. The signal processor 604 is disposed within the base 601 and connected to the wind speed sensor 602 and the signal transmitting component 603, respectively, and configured to control the signal transmitting component 603 to send a protecting signal to the window cleaning robot 500 when the outdoor wind force is greater than the default wind force.

Moreover, the window cleaning robot 500 comprises a signal receiving component 502 and a controller 503.

The signal receiving component 502 is configured to receive the protecting signal sent out by the wind speed detecting module 600. The controller 503 is connected to the signal receiving component 502 and configured to control the window cleaning robot 500 to execute the safety controlling strategy to return to the default security area after the signal receiving component 502 receives the protecting signal.

Specifically the wind speed sensor 602 may directly detect the outdoor wind force, generate an electrical signal according to the detected outdoor wind force and send the electrical signal to the signal processor 604; and the signal processor 604 processes and analyzes the electrical signal once receiving it to produce an analysis result, and control the signal transmitting component 603 based on the analysis result.

When the outdoor wind force detected by the wind speed sensor 602 is greater than the default wind force, the signal processor 604 determines whether the electrical signal sent out by the wind speed sensor 602 meets the default protecting condition that, for example, the voltage value of the electrical signal is greater than the default voltage value, if it meets the default protecting condition, the signal processor 604 immediately controls the signal transmitting component 603 to send out the protecting signal, such as an infrared signal with default frequency. When the signal receiving component 502 of the window cleaning robot 500 receives the protecting signal, the controller 503 determines whether the outdoor wind force at this time is greater than the default wind force, if it is, the controller 503 starts using the safety controlling strategy in accordance with a default program, so as to enable the window cleaning robot 500 to return to the default security area, thereby protecting the window cleaning robot from falling off.

In a specific embodiment of the present disclosure, the signal transmitting component 603 may comprise a first wireless communication unit, and the signal receiving component 502 may comprise a second wireless communication unit which communicates with the first wireless communication unit. Thus, the signal transmitting component 603 sends the protecting signal to the signal receiving component 502 by wirelessly communicating with the signal receiving component 502.

More specific, the first wireless communication unit may be an infrared transmitter, and the second wireless communication unit may be an infrared receiver, that is, when the outdoor wind force detected by the wind speed sensor 602 is greater than the default wind force, the signal processor 604 controls the infrared transmitter to send out the infrared signal with default frequency, and the controller 503 starts using the safety controlling strategy (i.e. a default software program) to control the window cleaning robot 500 to return to the default security area after the infrared receiver receives the infrared signal with default frequency.

Above all, with the window cleaning robot system according to an embodiment of the present disclosure, the wind speed detecting module communicates with the window cleaning robot and is configured to detect the outdoor wind force and produce the protecting signal when the outdoor wind force is greater than the default wind force, and the window cleaning robot executes the safety controlling strategy to return to the default security area after receiving the protecting signal so as to protecting the window cleaning robot from falling off when the outdoor wind force increases, thereby increasing the service security and improving the user experience. Moreover, the window cleaning robot is running on battery power during returning to the default security area, thus the security is higher.

Figure 13:
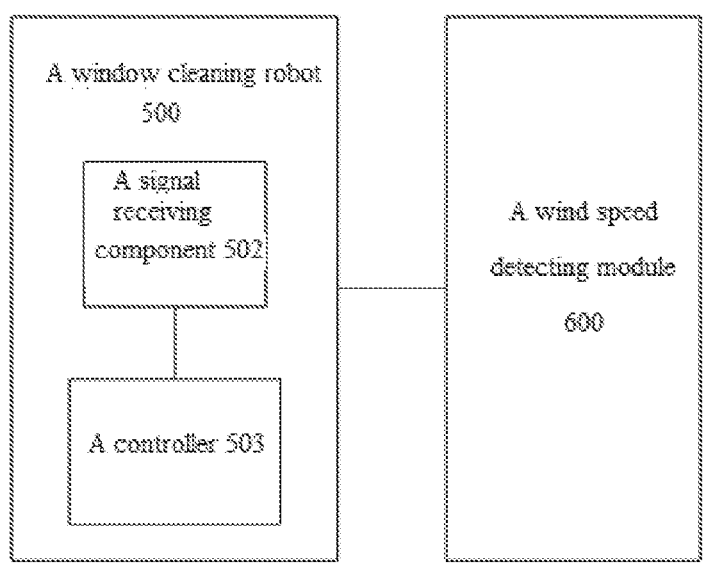
FIG. 13 is a block schematic view of a window cleaning robot according to another embodiment of the present disclosure.

FIG. 13 is a block schematic of a window cleaning robot according to another embodiment of the present disclosure. As shown in FIG. 13, the window cleaning robot 500 comprises: the signal receiving component 502 and the controller 503.

The signal receiving component 502 communicates with the wind speed detecting module 600, so as to receive the protecting signal sent out by the wind speed detecting module 600 when the outdoor wind force is greater than the default wind force. The controller 503 is connected to the signal receiving component 502 and controls the window cleaning robot 500 to execute the safety controlling strategy to return to the default security area after the signal receiving component 502 receives the protecting signal.

Specifically when the outdoor wind force is greater than the default wind force, the signal transmitting component of the wind speed detecting module 600 sends out the protecting signal, such as the infrared signal with default frequency, after the signal receiving component 502 receives the protecting signal, the controller 503 determines whether the outdoor wind force at this time is greater than the default wind force, if it is, the controller 503 starts using the safety controlling strategy in accordance with the default program, so as to enable the window cleaning robot 500 to return to the default security area, thereby protecting the window cleaning robot from falling off.

Therefore, the window cleaning robot provided according to embodiments of the present disclosure returns to the default security area when the outdoor wind force is greater than the default wind force so as to protect the window cleaning robot from falling off when the outdoor wind force increases, thereby increasing the service security and improving the user experience.

In a specific embodiment of the present disclosure, the signal receiving component 502 comprises a second wireless communication unit which communicates with a first wireless communication unit of the wind speed detecting module 600. Thus, the signal receiving component 502 receives the protecting signal by wireless communication with the wind speed detecting module 600.

More specific, the first wireless communication unit may be an infrared transmitter, and the second wireless communication unit may be an infrared receiver, that is, when the outdoor wind force is greater than the default wind force, the wind speed detecting module 600 controls the infrared transmitter to send out the infrared signal with default frequency, and the controller 503 starts using the safety controlling strategy (i.e. a default software program) to control the window cleaning robot 500 to return to the default security area after the infrared receiver receives the infrared signal with default frequency.

Above all, with the window cleaning robot according to an embodiment of the present disclosure, the signal receiving component receives the protecting signal when the outdoor wind force is greater than the default wind force, and the controller controls the window cleaning robot to execute the safety controlling strategy to return to the default security area after receiving the protecting signal so as to protecting the window cleaning robot from falling off when the outdoor wind force increases, thereby increasing the service security and improving the user experience. Moreover, the window cleaning robot is running on battery power during returning to the default security area, thus the security is higher.

Figure 14:
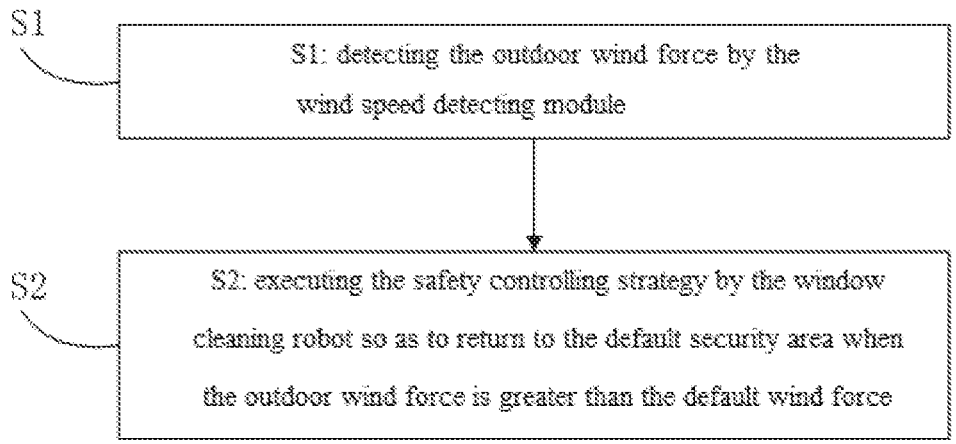
FIG. 14 is a flow chart showing a method for controlling a window cleaning robot according to an embodiment of the present disclosure.

FIG. 14 is a flow chart showing a method for controlling a window cleaning robot according to an embodiment of the present disclosure. As shown in FIG. 14, the method for controlling the window cleaning robot comprises the following steps:

S1: detecting the outdoor wind force by the wind speed detecting module; and

S2: executing the safety controlling strategy by the window cleaning robot so as to return to the default security area when the outdoor wind force is greater than the default wind force.

Figure 15:
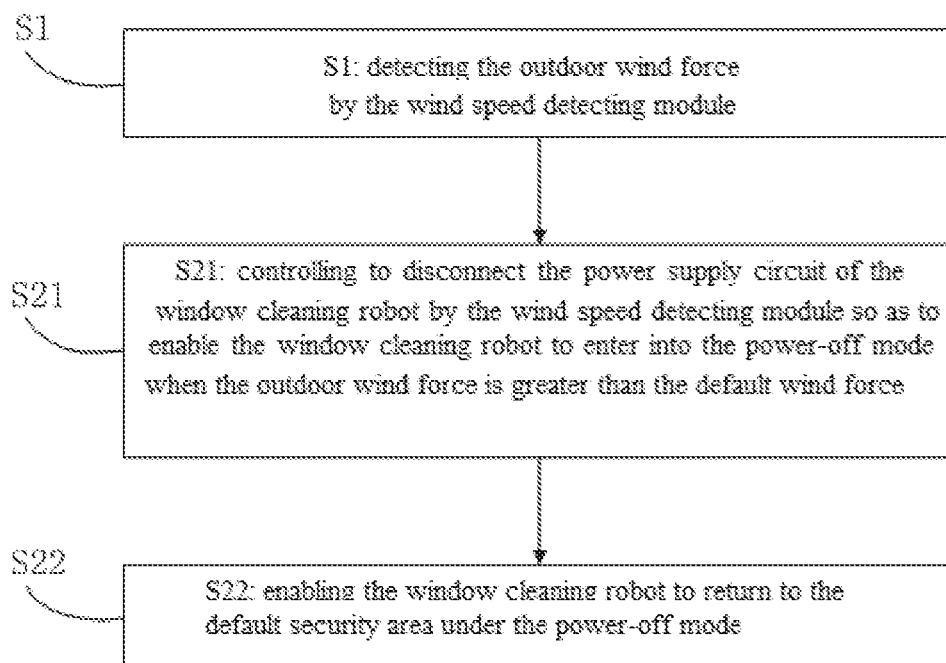
FIG. 15 is a flow chart showing a method for controlling a window cleaning robot according to a specific embodiment of the present disclosure.

In a specific embodiment of the present disclosure, as shown in FIG. 15, the step of executing the safety controlling strategy by the window cleaning robot so as to return to the default security area when the outdoor wind force is greater than the default wind force, i.e. S2 comprises the following steps:

S21: controlling to disconnect the power supply circuit of the window cleaning robot by the wind speed detecting module so as to enable the window cleaning robot to enter into the power-off mode when the outdoor wind force is greater than the default wind force; and S22: enabling the window cleaning robot to return to the default security area under the power-off mode.

Figure 16:
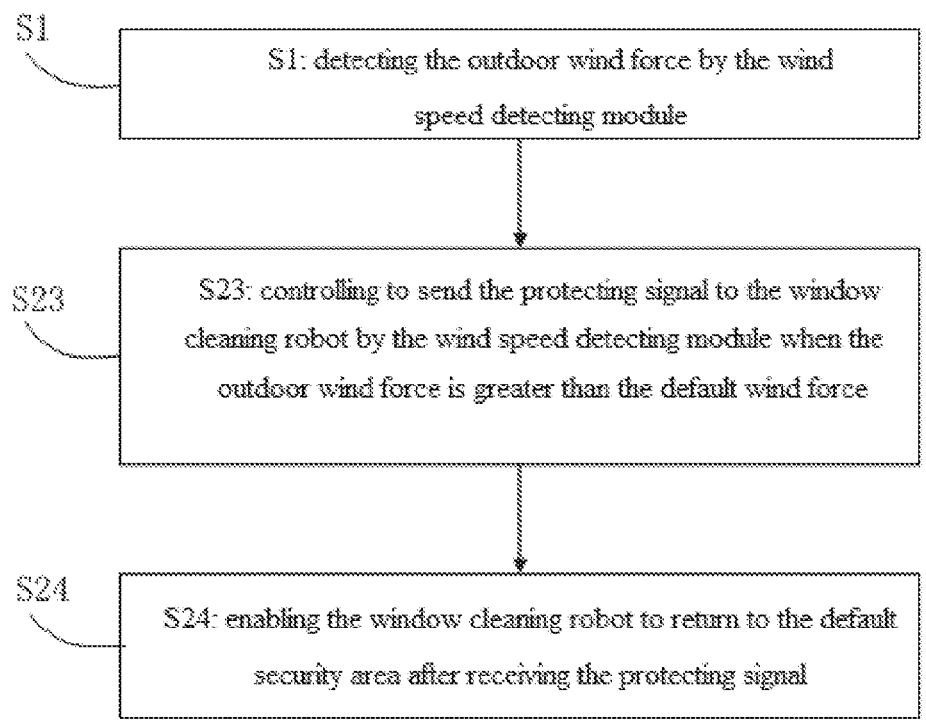
FIG. 16 is a flow chart showing a method for controlling a window cleaning robot according to another specific embodiment of the present disclosure.

In another specific embodiment of the present disclosure, as shown in FIG. 16, the step of executing the safety controlling strategy by the window cleaning robot so as to return to the default security area when the outdoor wind force is greater than the default wind force, i.e. S2 comprises the following steps:

S23: controlling to send the protecting signal to the window cleaning robot by the wind speed detecting module when the outdoor wind force is greater than the default wind force; and S24: enabling the window cleaning robot to return to the default security area after receiving the protecting signal.

The window cleaning robot is running on battery power during returning to the default security area, thus the security is higher.

Above all, with the method for controlling the window cleaning robot according to an embodiment of the present disclosure, the outdoor wind force is detected, and the window cleaning robot executes the safety controlling strategy to return to the default security area when the outdoor wind force is greater than the default wind force, so as to protecting the window cleaning robot from falling off when the outdoor wind force increases, thereby increasing the service security and improving the user experience.

The window cleaning robot according to a second embodiment of the present disclosure and a method for controlling the same will be described in the following with reference to FIGS. 17-24. In this embodiment, the detecting module is a temperature detecting device.

As shown in FIGS. 17-24, the window cleaning robot 100 according to an embodiment of the present disclosure comprises a window cleaning robot body, the temperature detecting device 2, and a controlling device 4. Herein, it should be noted that, other components and operations of the window cleaning robot 100 according to embodiments of the present disclosure are known to those ordinary skilled in the art, will not be elaborated here.

Figure 17:
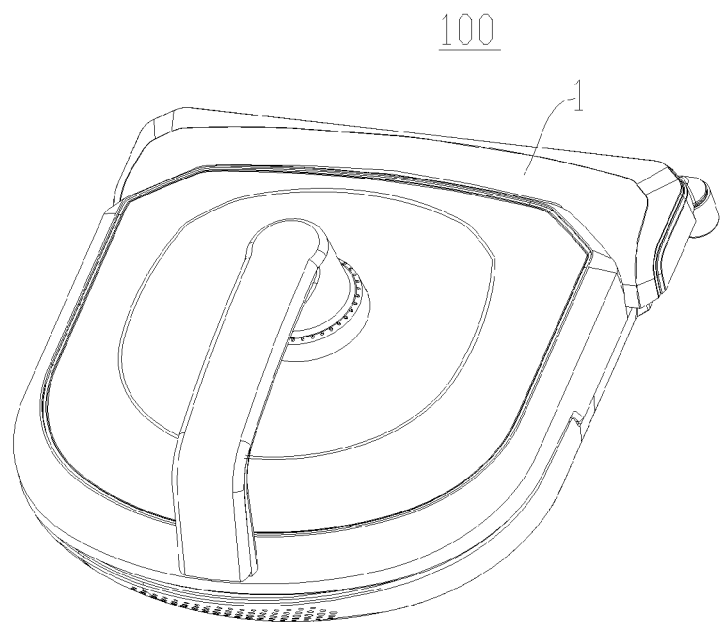
FIG. 17 is a front view showing a window cleaning robot according to an embodiment of the present disclosure.
Figure 18:
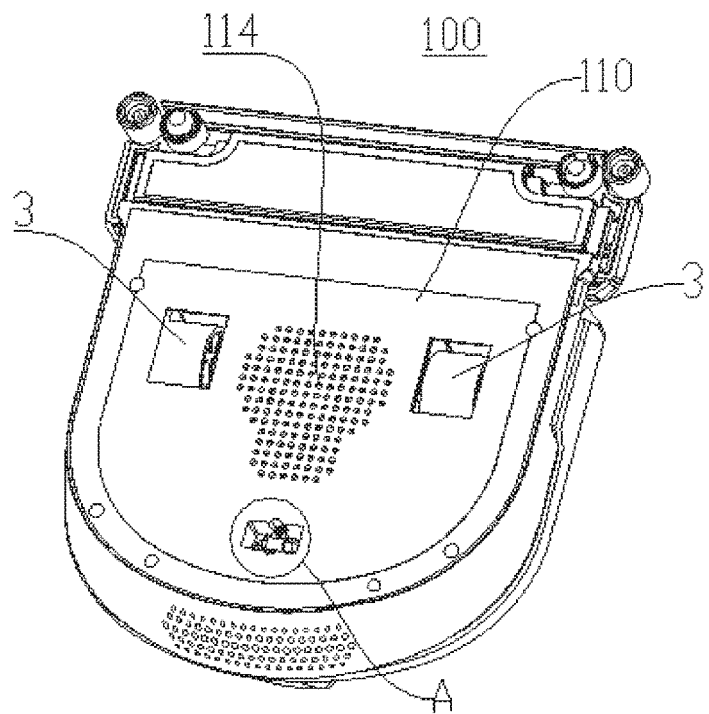
FIG. 18 is rear view showing a bottom of the window cleaning robot shown in FIG. 17.

As shown in FIG. 17 and FIG. 18, the temperature detecting device 2 is disposed on the window cleaning robot body and configured to detect a temperature outside the window cleaning robot body, that is to say, the temperature detecting device 2 is installed on the window cleaning robot body and is used to detect an air temperature outside the window cleaning robot body, for example, an air temperature around a surface of a window to be cleaned, thus the window cleaning robot 100 may real-timely perceive temperature changes in the working environment around it. Further, the controlling device 4 is configured to control an action of the window cleaning robot body and connected to the temperature detecting device 2, and the temperature detecting device 2 may send its temperature information detected to the controlling device 4 so as to enable the controlling device 4 to control the window cleaning robot body to take a corresponding action based on the current working environment temperature, thereby guaranteeing the service security of the window cleaning robot 100.

For an example, when the temperature detecting device 2 detects the environment temperature is lower, the controlling device 4 may control the window cleaning robot 100 to heat the surface of the window to be cleaned, so as to prevent from forming dew or ice on the window and avoid the window cleaning robot body slipping, or the controlling device 4 may also control to improve the suction of the window cleaning robot body and the window to be cleaned, or reduce the walking speed relative to the window to be cleaned and the like to avoid the window cleaning robot body slipping. For another example, when the temperature detecting device 2 detects the environment temperature is higher, the controlling device 4 may control the window cleaning robot body to cool the window to be cleaned, so as to increase the concentration of the air around the window to be cleaned to improve the problem of the weak suction of the window cleaning robot body and the window to be cleaned, thereby preventing the window cleaning robot body from falling off. Certainly, the controlling device 4 may also control to improve the suction of the window cleaning robot body and the window to be cleaned, or reduce the walking speed relative to the window to be cleaned and the like to avoid the window cleaning robot 100 slipping.

Above all, with the window cleaning robot 100 according to embodiments of the present disclosure, by installing the temperature detecting device 2 on the window cleaning robot body (such as on a bottom of the window cleaning robot body, i.e. on a surface of the window cleaning robot body adjacent to the window to be cleaned), the temperature detecting device 2 may real-timely detect the temperature of the surface of the window to be cleaned or the air temperature around it, so as to enable the controlling device 4 to control the window cleaning robot body to take the corresponding action based on the detected temperature. For example, when the detected temperature is higher or lower than a default value, the controlling device 4 may control the window cleaning robot body to take the corresponding action, thereby improving the service security of the window cleaning robot 100. Herein, it should be noted that, the default value may be a temperature range, such as 5° C.-25° C., "higher or lower than the default value" means higher than the maximum value of the temperature range (such as, above 25° C.), or lower than the minimum value of the temperature range (such as, below 5° C.).

From above, the method for controlling the window cleaning robot 100 according to embodiments of the present disclosure may comprise the following steps: detecting real-timely the temperature outside the window cleaning robot body by the wind speed detecting module 2 during the window cleaning robot woks, while controlling the window cleaning robot body by the controlling device 4 based on the temperature real-timely detected by the wind speed detecting module 2 to execute the corresponding action, i.e. the action suitable for the current working environment temperature to improve the service security of the window cleaning robot 100, for example, the actions of controlling the window cleaning robot body to send an alarm, or controlling the window cleaning robot body to reduce the walking speed on the window to be cleaned, or controlling to improve the suction of the window cleaning robot body and the window to be cleaned, or adjusting the temperature of the surface of the window to be cleaned. Based on these actions, the window cleaning robot 100 can adapt to temperature changes in the working environment very well, thereby improving the service security of the window cleaning robot 100.

Figure 22:
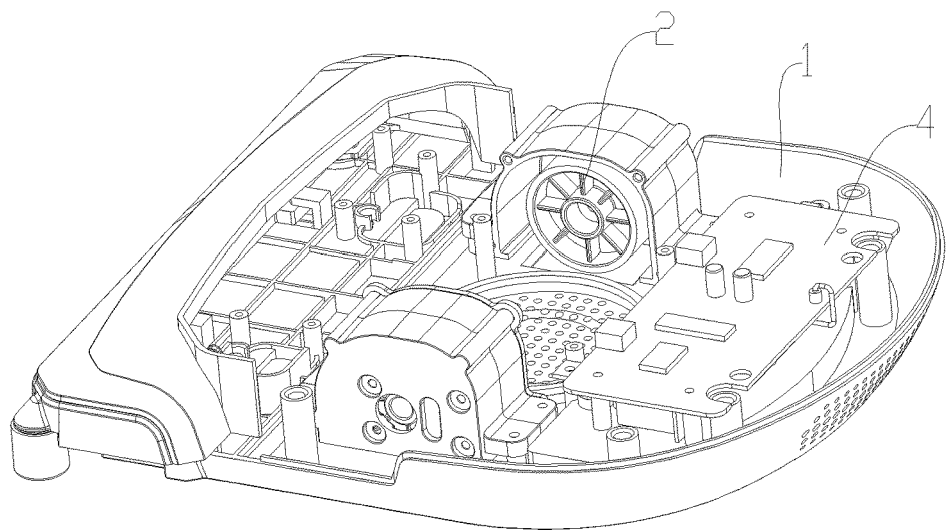
FIG. 22 is another front view showing the window cleaning robot shown in FIG. 17, in which a top cover of the window cleaning robot body is not shown.

In an embodiment of the present disclosure, with reference to FIG. 17, FIG. 18 and FIG. 22, the window cleaning robot body may comprise a casing 1, a window cleaning component (not shown in figures), and a fan 2. The casing 1 is formed with, for example, a plurality of suction inlets 114 on a bottom wall 110 (i.e. a surface adjacent to the window to be cleaned) thereof, and the plurality of suction inlets 114 evenly distribute on a central portion of the bottom of the casing 1. The window cleaning component, such as a cleaning rag, sponge, is disposed on the bottom wall 110 and surrounds the suction inlets 14, thus the window cleaning component, the bottom wall 110 together with the window to be cleaned may define a substantially sealed chamber. The fan 2 is disposed within the casing 1 and connected to the controlling device 4, that is to say, the fan 2 may be controlled by the controlling device 4 to execute an action, and the fan is configured to be controlled by the controlling device 4 to withdraw the air from the chamber through the suction inlets, such that the chamber is in a vacuum or a negative pressure states, so as to enable the window cleaning robot body as a whole to attach to the window to be cleaned. Certainly, the present disclosure is not limited to this, in other embodiments of the present disclosure, the casing 1 may provide with a suction cup on the wall 110 thereof, and the fan 2 may be adhered to the window to be cleaned through the suction cup, in which the concept of the suction cup is well known to those skilled in the art, which will not be elaborated here.

Therefore, when the air temperature real-timely detected by the temperature detecting device 2 is higher or lower than the default value, the controlling device 4 may control to increase the power of the fan 2 of the window cleaning robot body, thereby making an increase in the negative pressure of the chamber so as to improve the suction of the window cleaning robot body to the window to be cleaned, and further preventing the window cleaning robot 100 from falling off from the window or preventing the window cleaning robot 100 from slipping so as to improve the service security of the window cleaning robot 100.

In an embodiment of the present disclosure, the window cleaning robot body may comprise the casing 1 and a walking device 3, the walking device 3 is disposed on the casing 1 and connected to the controlling device 4, that is to say, the walking device 3 may be controlled by the controlling device 4 to execute an action and configured to be controlled by the controlling device 4 to drive the casing 1 to walk on the window to be cleaned. As in an example shown in FIG. 2, the walking device 3 may be a roller disposed on the bottom of the casing 1 and is used for support on the surface of the window to be cleaned, and the controlling device 4 is used to control the roller to run, so as to enable the roller to drive the casing 1 to walk on the window to be cleaned.

Therefore, when the air temperature real-timely detected by the temperature detecting device 2 is higher or lower than the default value, the controlling device 4 may control the walking device 3 of the window cleaning robot body to reduce the walking speed so as to improve the problems of falling off or slipping of the window cleaning robot 100, thereby improving the service security of the window cleaning robot 100.

In an embodiment of the present disclosure, the window cleaning robot body may comprise the casing 1 and an air conditioning device, the air conditioning device is disposed on the casing 1 and connected to the controlling device 4, that is to say, the air conditioning device may be controlled by the controlling device 4 to execute an action and configured to be controlled by the controlling device 4 to adjust the temperature of the surface to be cleaned of the window to be cleaned.

Therefore, when the air temperature real-timely detected by the temperature detecting device 2 is higher than the default value, the controlling device 4 may control the air conditioning device of the window cleaning robot body to cool the window to be cleaned, so as to increase the concentration of the air around the window to be cleaned, improve the problem of the weak suction of the window cleaning robot body and the window to be cleaned, thereby preventing the window cleaning robot body from falling off or slipping and improving the service security of the window cleaning robot 100. When the air temperature real-timely detected by the temperature detecting device 2 is lower than the default value, the controlling device 4 may control the air conditioning device of the window cleaning robot body to heat the window to be cleaned, so as to prevent from forming dew or ice on the window and avoid the window cleaning robot body falling off or slipping, thereby improving the service security of the window cleaning robot 100.

In an embodiment of the present disclosure, the window cleaning robot body may comprise the casing 1 and an alarming device, the alarming device is disposed on the casing 1 and connected to the controlling device 4, that is to say, the alarming device may be controlled by the controlling device 4 to execute an action and configured to be controlled by the controlling device 4 to send an alarm, in which the alarm may be a sound alarm or a light flashing alarm.

Therefore, when the air temperature real-timely detected by the temperature detecting device 2 is higher or lower than the default value, the controlling device 4 may control the alarming device of the window cleaning robot body to send the alarm, so as to make the user know that the window cleaning robot 100 is in a dangerous working condition. Then, the user may manually take some measures, such as taking the window cleaning robot 100 back and treating the window to be cleaned, thereby avoiding the window cleaning robot 100 falling off from the window to be cleaned or slipping and improving the service security of the window cleaning robot 100.

The temperature detecting device 2 of the window cleaning robot 100 according to embodiments of the present disclosure will be briefly described below.

As shown in FIG. 18, FIG. 19, FIG. 22 and FIG. 24, the controlling device 4 (such as PCB plate) is disposed within the window cleaning robot body, such as the casing 1 for protecting the controlling device 4. The temperature detecting device 2 comprises a probe 201 and a conducting wire 202, at least a part of the probe 201 is disposed outside the window cleaning robot body and configured to detect the temperature outside the window cleaning robot body, the conducting wire 202 has one end connected to the probe 201 and the other end connected to the controlling device 4, that is to say, the probe 201 and the controlling device 4 are connected through the conducting wire 202, and the temperature detected by the probe 201 is transmitted to the controlling device 4 via the conducting wire 202. Therefore, the temperature detecting device 2 has a simple structure convenient for installation and a high temperature detecting accuracy.

Certainly, the present disclosure is not limited to this, the controlling device may also be disposed outside the window cleaning robot body, for example, the controlling device may be a smart chip and loaded in a remote control handle so as to remotely control the window cleaning robot body, and the probe 201 may be in connection with the controlling device communicatively to achieve transmitting of the signal of the detected temperature.

Figure 19:
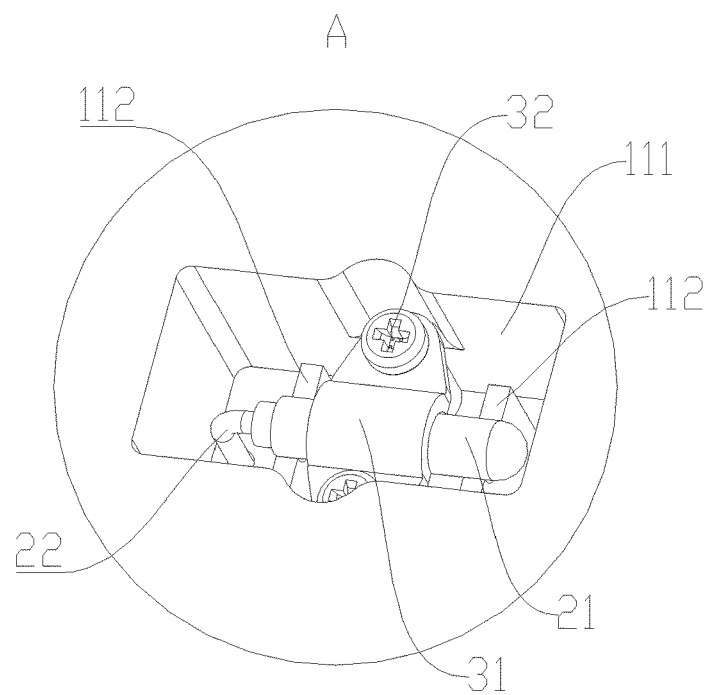
FIG. 19 is an enlarged schematic view of part A shown in FIG. 18.
Figure 20:
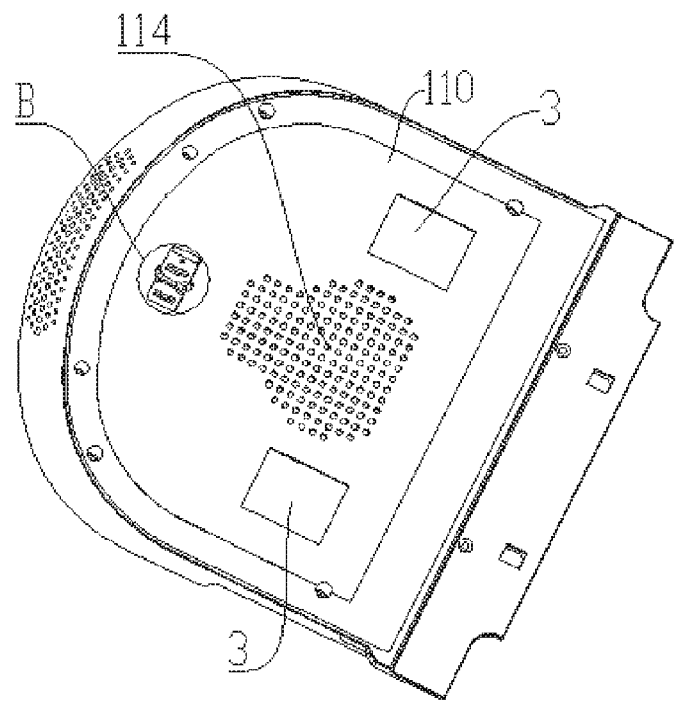
FIG. 20 is another rear view showing the bottom of the window cleaning robot shown in FIG. 17, in which the temperature detecting device is not shown.
Figure 24:
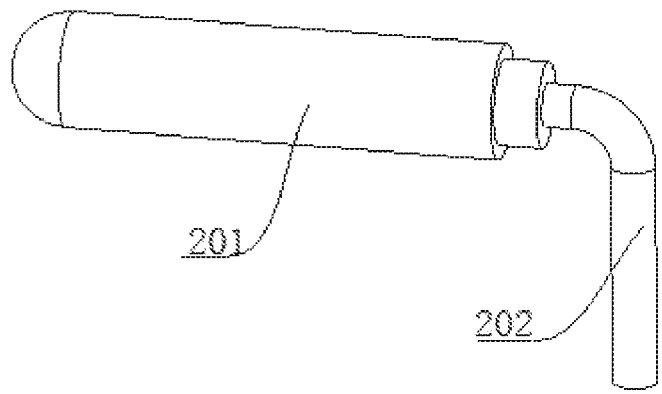
FIG. 24 is a schematic view of the temperature detecting device shown in FIG. 17.

Preferably, with reference to FIG. 18, FIG. 19 and FIG. 24, the window cleaning robot body is provided with a mounting slot 111 on the bottom wall 110 thereof, for example, the mounting slot 111 is formed of a concave upward part of the bottom wall 110 of the casing 1, such that a bottom of the mounting slot 111 is open, the probe 201 is mounted within the mounting slot from the bottom of the mounting slot 111 to top and exposed to the air outside the mounting slot 111. One end of the conducting wire 202 is disposed within the mounting slot 111 and connected to the probe 201 and the other end of the conducting wire 202 passes through the mounting slot 111 and is connected to the controlling device 4.

Therefore, the mounting slot 111 may play a role in protecting the probe 201 from being scratched. In addition, the convenience and the reliability of the probe 201 are improved and the overall structure compactness and the aesthetics of the window cleaning robot 100 are improved by installation of the probe 201 within the mounting slot 111.

Preferably, the temperature detecting device 2 may be fixed within the mounting slot 111 through a fixing component, thereby improving the installation reliability of the temperature detecting device 2, ensuring the temperature detecting device 2 to work safely and reliably, and improving the service life of the temperature detecting device 2. As shown in FIG. 2 to FIG. 5, the fixing component may comprise a fixed cover 31 and a fastener 32. The fixed cover 31 comprises a receiving portion 311 and a connecting portion 312 which are connected with each other, and the probe 201 is accommodated between the receiving portion 311 and a top wall of the mounting slot 111 (i.e. a wall of the mounting slot 111 away from the window to be cleaned). The fastener 32 fastens the connecting portion 312 to the mounting slot 111 (such as fasten the connecting portion 312 to the top wall of the mounting slot 111), and the fastener 32 may be, for example, a threaded fastener 32 for fastening the connecting portion 312 to the mounting slot 111. Thus, the assembly is convenient.

Figure 23:
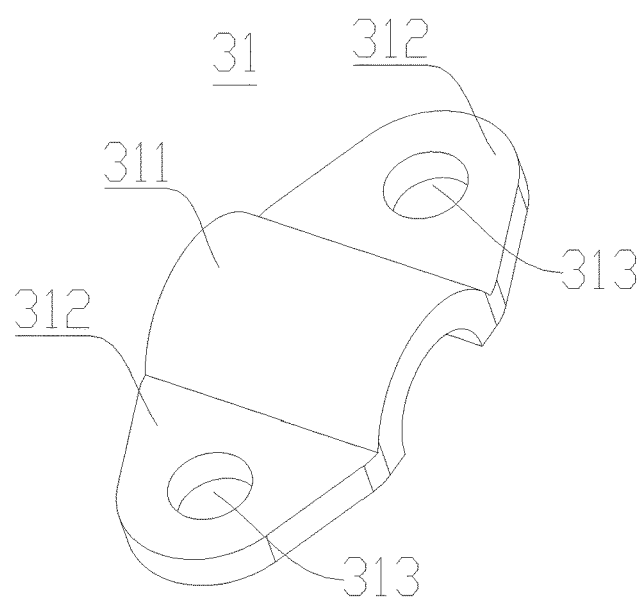
FIG. 23 is a schematic view of the fixed cover shown in FIG. 17.

Preferably, with reference to FIG. 19, FIG. 23, and FIG. 24, the probe 201 is configured to be substantially long cylindrical, and the receiving portion is configured to be semicylindrical. The receiving portion and the probe 201 are substantially coaxially provided and the receiving portion covers the probe 201. There are two connecting portions 312 which are connected to the receiving portion 311 on both sides in a radial direction respectively, that is to say, the receiving portion 311 is provided with two ear-shaped connecting portions 312 on both sides respectively, each of the connecting portions 312 is provided with an installing hole 313 (such as screw hole) thereon. Therefore, the two connecting portion 312 may be fasten to the mounting slot 111 with two fasteners 32 which pass through the corresponding installing holes 313 respectively, thereby improving the fastness of the fixed cover 31 and the temperature detecting device 2. In addition, the fixed cover 31 having a simple structure is easy to process and convenient to connect with the fastener 32, thereby ensuring installation reliability of the temperature detecting device 2.

Figure 21:
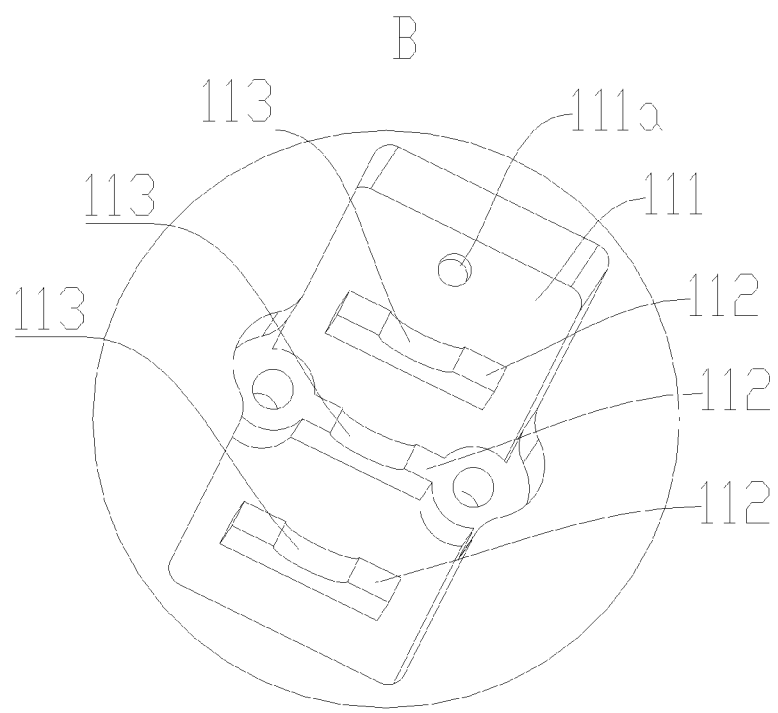
FIG. 21 is an enlarged schematic view of part B shown in FIG. 20.

Further, with reference to FIG. 19 and FIG. 21, the mounting slot 111 is provided with a supporting rib 112 on the top wall thereof, and the probe 201 is supported on the supporting rib 112. Therefore, the probe 201 is away from the surface of the window cleaning robot body, so as to reduce the impact of the surface temperature of the window cleaning robot body on the temperature detected by the probe 201, thereby improving the accuracy of the temperature measurement by the probe 201. In addition, there are a plurality of supporting ribs 112, and the plurality of supporting ribs 112 are spaced apart from each other in a length direction (for example in axis direction) of the probe 201 so as to support the probe 201 respectively, thereby improving the installation reliability of the probe 201 and further improving the accuracy of the temperature measurement by the probe 201.

Preferably, with reference to FIG. 19 and FIG. 21, the supporting rib 112 is formed with a positioning slot 113, and a part of the probe 201 is accommodated and positioned within the positioning slot 113. For example, in the example shown in FIG. 5, the positioning slot 113 is configured to as an arch and is formed of a concave upward part of the bottom wall 110 of the supporting rib 112, and the radius of the positioning slot 113 is roughly equal to that of the probe 201, such that the probe 201 may be defined by the positioning slot 113, thereby resolving the problem of the movement of probe 201 and further improving the work reliability of the probe 201.

Therefore, during assembling the temperature detecting device 2 according to embodiments of the present disclosure, the probe 201 of the temperature detecting device 2 is firstly placed on the supporting rib 112 of the mounting slot 111 which is positioned at the bottom of the casing 1, and the probe 201 is supported within the positioning slot 113 of the supporting rib 112 and covered with the fixed cover 31, and then the fixed cover 31 is fixed in the mounting slot 111 by using two fasteners 32 which pass through the corresponding installing holes 313 respectively, and the conducting wire 202 of the temperature detecting device 2 passes through the via hole 111a of the mounting slot 111 into the casing 1 and is connected to the controlling device 4 (such as the PCB plate).

Above all, with the window cleaning robot 100 according to embodiments of the present disclosure, during working, the temperature detecting device 2 may real-timely detect the temperature of the air around the surface of the window to be cleaned and transmit the temperature signals detected to the controlling device 4 (such as the PCB plate), and the controlling device 4 controls the window cleaning robot body to automatically take the corresponding action in accordance with the default program when the detected temperature is higher or lower than the default value. For an example, when the detected temperature is so low that the surface of the window to be cleaned is prone to forming dew or ice thereon, the controlling device 4 may control to reduce the walking speed of the window cleaning robot body or send the alarm so as to avoid the window cleaning robot 100 slipping. For another example, when the detected temperature is so high that the vacuum suction produced by the fan 2 is reduced and the window cleaning robot probably fall off from the window to be cleaned, the controlling device 4 may automatically control to increase the rotating speed of the fan 2 of the window cleaning robot body or send the alarm, thereby improving the service security of the window cleaning robot 100 by taking at least one corresponding action.

The window cleaning robot 100 according to the third embodiment of the present disclosure will be described in detail below with reference to FIG. 25 to FIG. 29. In this embodiment, the detecting module is a snow and rain sensor, and the controlling device is a circuit board.

The window cleaning robot 100 according to an embodiment of the present disclosure comprises the window cleaning robot body 10, the snow and rain sensor 20, and the circuit board 30.

Specifically, the snow and rain sensor 20 is disposed in the window cleaning robot body 10 and has a sensing surface 21 exposed to the outside of the window cleaning robot body 10, and the sensing surface 21 is configured to detect whether snow or rain is present thereon and generate a sensing signal.

Figure 25:
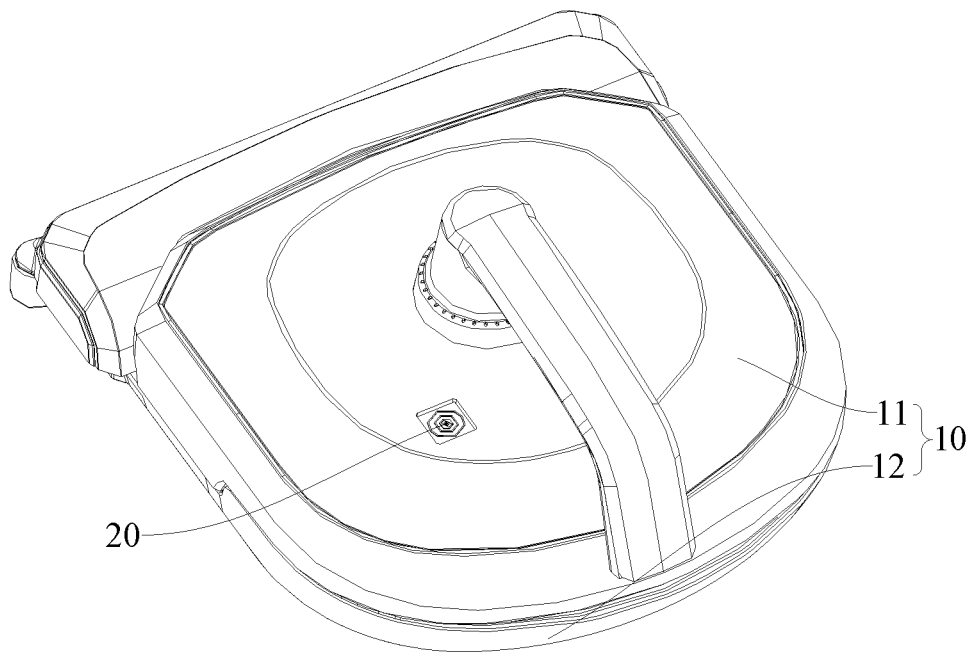
FIG. 25 is a structure schematic view of a window cleaning robot according to an embodiment of the present disclosure.
Figure 26:
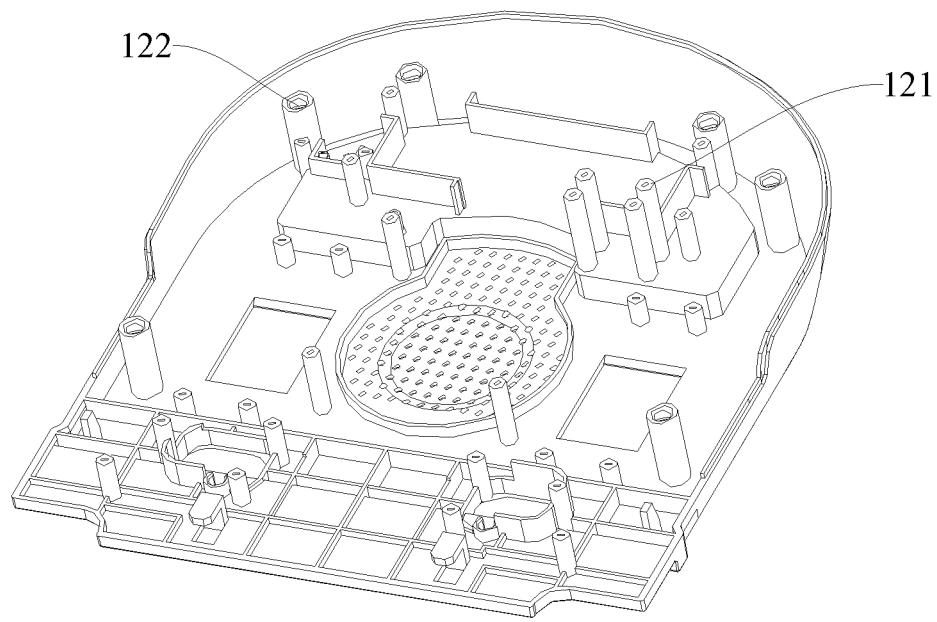
FIG. 26 is a structure schematic view of a base of a window cleaning robot according to an embodiment of the present disclosure.
Figure 27:
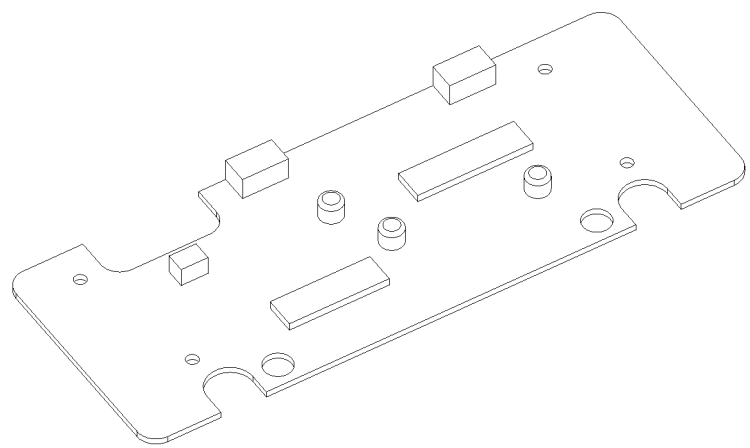
FIG. 27 is a structure schematic view of a circuit board of a window cleaning robot according to an embodiment of the present disclosure.

With reference to FIG. 25, the window cleaning robot body 10 is provided with the snow and rain sensor 20, and the sensing surface 21 of the snow and rain sensor 20 is disposed outside the window cleaning robot body 10 to sense changes in the environment outside the window cleaning robot body 10. Specifically, the sensing surface 21 of the snow and rain sensor 20 is able to sense the outside weather conditions and determine whether it rains and snows, and generate different signals depending on the weather conditions, thereby enabling the window cleaning robot body 10 to take the corresponding action to avoid damage.

When the weather becomes rainy and snowy and the user doesn't know, the snow and rain sensor 20 of the window cleaning robot 100 can sense the changes and takes the corresponding protecting action, for example, reducing the walking speed of the window cleaning robot 100, improving the suction of the whole window cleaning robot 100 and the window, and moving back to the corner of the window to take shelter from the rain and snow, which not only can prevent rainwater and snow meltwater from entering into the window cleaning robot 100 to influence the normal work of the window cleaning robot 100 or damage the internal parts thereof, thereby prolonging the service life of the window cleaning robot 100, but also can prevent the window cleaning robot 100 from falling off when the surface of the window is slippery, thereby ensuring the service security of the window cleaning robot 100.

Further, the circuit board 30 is disposed in the window cleaning robot body 10 and connected to the snow and rain sensor 20, and is configured to receive the sensing signal of the snow and rain sensor 20 and control the action of the window cleaning robot body 10 based on the sensing signal.

That is to say, the circuit board 30 can receives the weather feedback signal from the snow and rain sensor 20 and make a corresponding control for the window cleaning robot body 10 based on the received weather signal. Specifically, when the weather is sunny, the snow and rain sensor 20 sends a signal of good weather to the circuit board 30, and then the circuit board 30 controls the window cleaning robot body 10 to clean the window; when the weather changes, for example when it rains or snows, the snow and rain sensor 20 sends a signal of rain or snow to the circuit board 30, the circuit board 30 will control the window cleaning robot body 10 to take the corresponding action, for example moving back to the corner of the window to take shelter from the rain and snow, or improving the suction of the window cleaning robot body 10 by increasing the power of the fan.

Therefore, with the window cleaning robot 100 according to embodiments of the present disclosure, the circuit board 30 receives the feedback signal form the snow and rain sensor 20 and controls the window cleaning robot body 10 to take the corresponding action by providing the snow and rain sensor 20 in the window cleaning robot body 10, thereby realizing the automatic operation of the window cleaning robot 100 so as to improve the intelligent level of the window cleaning robot 100, reduce troubles the user encountered and protect the window cleaning robot 100 without the manual operation, thereby not only protecting the property safeties of users, but also avoiding harm to a pedestrian outside the window by preventing the window cleaning robot 100 from falling off.

The window cleaning robot body 10 comprises a base 12 and an upper casing 11, the base 12 together with the upper casing 11 define a receiving chamber (not shown), the snow and rain sensor 20 is disposed in the receiving chamber, and the upper casing has an opening (not shown) from which the sensing surface 20 is exposed.

In other words, the window cleaning robot body 10 is mainly composed of the base 12 and the upper casing 11 which have the edges with the same shape and can be locked together. The locked the base 12 and the upper casing 11 form the casing of the window cleaning robot 100, which defines the receiving chamber (not shown) for accommodating parts (such as the rain and snow sensor 20 and the like), and the rain and snow sensor 20 is installed in the receiving chamber, the upper casing 11 of the window cleaning robot body 10 is provided with the opening which is connected with the receiving chamber. The sensing surface 21 of the snow and rain sensor 20 is exposed from the opening.

Therefore, the receiving chamber for installing the rain and snow sensor 20 is defined by the gap between the base 12 and the upper casing 11, which can not only take full advantage of the space within the window cleaning robot body 10, reduce the contour dimension of the window cleaning robot 100, and is easy to use and store, but also ensure the stable installation of the rain and snow sensor 20 within the window cleaning robot body 10, avoid the rain and snow sensor 20 shaking, reduce the failure rate of rain and snow sensor 20, and prolong the service life of the window cleaning robot 100. Moreover, the installation way can prevent the rain and snow sensor 20 from interference with other components within the window cleaning robot body 10, thereby ensuring the normal operation of the window cleaning robot 100.

It can be understood that, the opening disposed between the upper casing 11 and the receiving chamber may ensure the sensing surface of the rain and snow sensor 20 to contact with the external environment, so as to ensure the accuracy of the rain and snow sensor 20, prevent the rain and snow sensor 20 from affecting the control of the circuit board 30 on the window cleaning robot body 10 due to the inaccurate or untimely sense of the sensing surface, so as to eliminate the wrong operation.

Preferable, the sensing surface 21 is level with an upper surface of the upper casing 11, that is, the sensing surface 21 and the upper surface of the upper casing 11 are located on the same plane, the snow and rain sensor 20 is exposed form the opening, the boundary of the sensing surface 21 coincides with the upper boundary of the opening, the sensing surface 21 neither protrude from the upper surface of the upper casing 11 nor below the upper surface of the upper casing 11, thereby not only preventing rainwater from entering into the window cleaning robot body 10 through the opening when it rains, so as to protect the internal components of the window cleaning robot body 10 from erosion by the rain and protect the sensing surface 21 from being damaged, but also increasing the sensitivity and prolonging the service life of the sensing surface 21.

Specifically, the base 12 is provided with a sensor mounting column 121, and the snow and rain sensor 20 is connected to the sensor mounting column 121 and mounted on the base 12 through the sensor mounting column 121.

Figure 28:
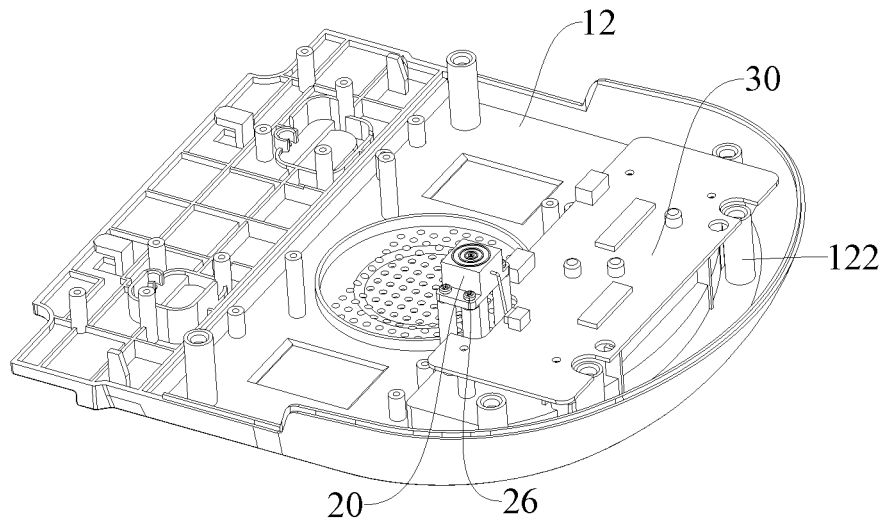
FIG. 28 is an assembly schematic view of a window cleaning robot according to an embodiment of the present disclosure.

As shown in FIG. 28, in this embodiment, the base 12 is provided with a plurality of mounting columns 121 which are spaced apart from each other, each of the mounting columns 121 is formed as a cylindrical structure extending in a vertical direction. One end of the mounting column 121 is connected to the snow and rain sensor 20 and the other end of the mounting column 121 is fixed on the base 12. The length and the number of the mounting columns 121 may be determined based on the positional relationship between the rain and snow sensor 20 and the base 12 and the shape of the base 12 to ensure the fixed installation of the snow and rain sensor 20.

It may ensure the installation stability of the rain and snow sensor 20 and avoid damage to the rain and snow sensor 20 or avoid causing low sensitivity due to shaking by installing the rain and snow sensor 20 on the mounting columns 121 of the base 12. As the length and the number of the mounting columns 121 are controllable and adjustable, the selectivity of the base 12 and the rain and snow sensor 20 is increased, and the design scheme of the base 12 is optimized.

The snow and rain sensor 20 is provided with a mounting base 22, the mounting base 22 is provided with a screw hole 23, and the snow and rain sensor 20 is mounted on the mounting column 121 through screw hole 23.

Specifically, as shown in FIG. 28, the snow and rain sensor 20 is provided with the mounting base 22 on the side thereof which is connected to the mounting columns 121, the mounting base 22 is provided with the screw hole 23 which corresponds to the mounting columns 121, and the mounting base 22 is fixed on the mounting columns 121 by the screw 26 which passes through the screw hole 23, thereby ensuring the fixed installation of the snow and rain sensor 20 and the base 12. Such connection way may prevent the snow and rain sensor 20 from being influenced by the screw 26 during the usage and installation, and also prevent the sensing components within the snow and rain sensor 20 from being damaged when the screw 26 passes through the snow and rain sensor 20. The snow and rain sensor 20 has a simple structure and a reliable connection. The snow and rain sensor 20 not only is easy to assemble and disassemble, but also is easy to repair and replace its component.

Advantageously, the base 12 is also provided with a plurality of supporting columns 122, the circuit board 30 is mounted on the base 12 through the supporting columns 122. That is to say, besides the mounting column 121, the base 12 is also provided with the plurality of supporting columns 122. Each of the supporting columns 122 may be formed as a cylindrical structure, or a rectangular structure. One end of the supporting column 122 is fixed on the base 12, and the other end of the supporting column 122 is connected to the circuit board 30.

At least two of supporting columns 122 are provided with threaded holes at the ends away from the base 12, the screw 26 passes through the circuit board 30 and is fixed within the threaded hole, so as to fix the circuit board 30 on the base 12; at least a part of supporting columns 122 are not provided with threaded holes and abuts against the lower surface of the circuit board 30, so as to prevent the circuit board 30 from moving.

Therefore, the circuit board 30 may not be affected by other components by providing the supporting columns 122 with different lengths and different structures according to the specific structure of the base 12 around the circuit board 30, thereby ensuring the stable installation and improving the assembly efficiency. Moreover, the circuit board 30 does not need to make a corresponding change according to the structure of the base 12 by utilizing the supporting columns 122 to fix the circuit board 30, thereby optimizing the design scheme of the circuit board 30 and reducing the production cost of the circuit board 30.

Alternatively, the circuit board 30 is adjacent to the snow and rain sensor 20, that is, the snow and rain sensor 20 is disposed near the circuit board 30. The circuit board 30 is fixed on the base 12 through the supporting columns 122, the snow and rain sensor 20 is fixed on the base 12 through the mounting column 121, and the mounting column 121 is adjacent to the supporting columns 122. During installation, the snow and rain sensor 20 is installed on the side of the circuit board 30 at small intervals, thereby facilitating the connection of the snow and rain sensor 20 and the circuit board 30 and achieving the transmission of signals.

The snow and rain sensor 20 is adjacent to the circuit board 30, thereby saving the installation space within the window cleaning robot body 10, easily achieving the connection of the snow and rain sensor 20 and the circuit board 30 and optimizing the circuit design within the window cleaning robot body 10.

Alternatively, the snow and rain sensor 20 is connected to the circuit board 30 through a cable 24, that is, an electric connection between the snow and rain sensor 20 and the circuit board 30 is achieve through the cable 24.

Specifically, one end of the cable 24 is connected to the snow and rain sensor 20, the other end of the cable 24 is connected to the circuit board 30, and the signal is transmitted through the cable 24, i.e. the snow and rain sensor 20 feeds back the signal to the circuit board 30 through the cable 24, and then the circuit board 30 controls the action of the window cleaning robot body 10 based on the feedback signal. It has a simple structure and is easily operated. The cable 24 may be suitably selected based on the distance between the circuit board 30 and the snow and rain sensor 20, thereby reducing the production cost, improving the assembly efficiency and ensuring the normal operation of the window cleaning robot body 10.

Figure 29:
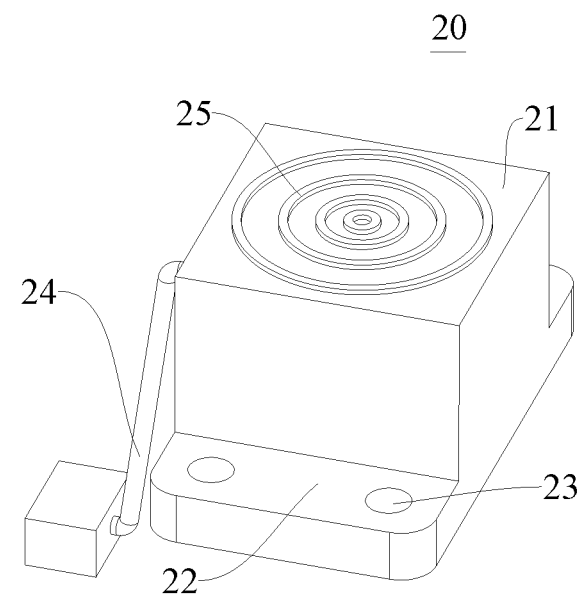
FIG. 29 is a structure schematic view of a snow and rain sensor of a window cleaning robot according to an embodiment of the present disclosure.

With reference to FIG. 29, in this embodiment, the sensing surface 21 is configured as a grid electrode 25, specifically a plurality of grid electrodes 25 are gradually diffusely formed on the surface of the sensing surface 21. The grid electrodes 25 are connected to an internal detecting circuit of the snow and rain sensor 20 and configured to detect whether it rains or snows.

For example, the snow and rain sensor 20 is provided with an intelligent microprocessor therein, the grid electrodes 25 senses the rain and snow by utilizing the conductive properties of the rainwater, and the snow and rain sensor 20 determines whether it rains or snows through the detecting circuit and the microprocessor. Thus, the snow and rain sensor 20 has a sensitive response and a high measuring precision. The snow and rain sensor 20 is convenient to installation and use.

A working process of the window cleaning robot 100 according to an embodiment of the present disclosure will be described below in combination with a specific embodiment.

As shown in FIG. 25 and FIG. 28, the window cleaning robot 100 is mainly composed of the window cleaning robot body 10, the snow and rain sensor 20 and the circuit board 30. The snow and rain sensor 20 and the circuit board 30 are fixed within the window cleaning robot body 10 respectively and connected with each other through a signal. The upper surface of the snow and rain sensor 20 is formed with the grid electrode 25, and the grid electrode 25 is exposed to the external environment through the opening in the window cleaning robot body 10 so as to facilitate sensing the work environment outside the window cleaning robot 100.

Specifically when the window cleaning robot 100 works outside, the snow and rain sensor 20 may detect whether it rains or snows and feed back the detected data signal to the circuit board 30 when it senses a corresponding situation, and then the circuit board 30 automatically takes an action based on the default program.

For example, the circuit board 30 may control the window cleaning robot 100 to send a high-decibel alarm to alert the user; reduce the walk speed of the window cleaning robot 100 to reducing risk of slipping; increase the operating speed of a vacuum pumping fan (not shown) to improve the vacuum suction of the whole window cleaning robot 100; and also control the window cleaning robot 100 to automatically moving back to the corner of the window to take shelter from the rain and snow.

With the window cleaning robot 100 according to embodiments of the present disclosure, the snow and rain sensor 20 is provided and default measures is preset, thereby not only preventing the rainwater or snowmelt from entering into the window cleaning robot so as to protect the internal components of the window cleaning robot 100 from erosion by the rainwater or snowmelt and preventing the window cleaning robot 100 from falling off when the window surface is slippery so as to protect the window cleaning robot 100 from being damaged, but also effectively improving the outside service security of the unattended window cleaning robot 100 and prolonging the service life thereof.

Other components and operations of the window cleaning robot 100 according to embodiments of the present disclosure are known to those ordinary skilled in the art, will not be elaborated here.

In the specification, it is to be understood that terms such as "central," "longitudinal," "lateral," "length," "width," "thickness," "upper," "lower," "front," "rear," "left," "right," "vertical," "horizontal," "top," "bottom," "inner," "outer," "clockwise," and "counterclockwise" should be construed to refer to the orientation as then described or as shown in the drawings under discussion. These relative terms are for convenience of description and do not require that the present disclosure be constructed or operated in a particular orientation, and thus shall not be construed to limit the present disclosure.

In addition, terms such as "first" and "second" are used herein only for purposes of description and are not intended to indicate or imply relative importance or significance or to imply the number of indicated technical features. Thus, the features defined with "first" and "second" may explicitly or implicitly comprise one or more of this feature. In the description of the present disclosure, "a plurality of" means two or more than two, unless specified otherwise.

In the present disclosure, unless explicitly specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations.

In the present disclosure, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

Reference throughout this specification to "one embodiment," "some embodiments," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described above, it would be appreciated by those skilled in the art that the above embodiments are explanatory, and cannot be construed to limit the present disclosure, and changes, alternatives, and modifications can be made to the above embodiments in the scope of the present disclosure without departing from spirit and principles of the present disclosure.

What is claimed is:

1. A window cleaning robot, comprising:
   a window cleaning robot body;
   a detecting module disposed on the window cleaning robot body and configured to detect an environment outside the window cleaning robot body; and
   a controlling device connected to the detecting module and configured to control an action of the window cleaning robot body based on a data detected by the detecting module,
   wherein the detecting module is a wind speed detecting module for detecting outdoor wind force, and
   the window cleaning robot body further comprises:
   a power adapter for converting an alternating current into a direct current so as to supply power to the window cleaning robot body,
   wherein the wind speed detecting module is connected in series between the window cleaning robot body and the power adapter, and the window cleaning robot body executes a safety controlling strategy to return to a default security area when the outdoor wind force is greater than a default wind force.

2. The window cleaning robot according to claim 1, wherein the wind speed detecting module is detachable connected to the window cleaning robot body, and/or the wind speed detecting module is detachable connected to the power adapter.

3. The window cleaning robot according to claim 1, wherein the wind speed detecting module comprises:
   a first base;
   a first wind speed sensor for detecting the outdoor wind force which is disposed on the first base;
   a first power supply circuit connected in series between the window cleaning robot body and the power adapter so as to enable the power adapter to supply power to the window cleaning robot body by means of the first power supply circuit; and
   a first signal processor disposed within the first base and connected to the first wind speed sensor and configured to control to disconnect the first power supply circuit so as to enable the window cleaning robot body to enter into a power-off mode when the outdoor wind force is greater than the default wind force.

4. The window cleaning robot according to claim 3, wherein the window cleaning robot body comprises a power supply battery which supplies power to the window cleaning robot body so as to enable the window cleaning robot body to return to the default security area when the window cleaning robot body is in the power-off mode.

5. The window cleaning robot according to claim 1, wherein the wind speed detecting module comprises:
   a second base;
   a second wind speed sensor for detecting the outdoor wind force which is disposed on the second base;
   a second power supply circuit connected in series between the window cleaning robot body and the power adapter so as to enable the power adapter to supply power to the window cleaning robot body by means of the second power supply circuit;
   a signal transmitting component; and
   a second signal processor disposed within the second base and connected to the second wind speed sensor and the signal transmitting component respectively and configured to control the signal transmitting component to send a protecting signal to the window cleaning robot body when the outdoor wind force is greater than the default wind force.

6. The window cleaning robot according to claim 5, wherein the window cleaning robot body comprises:
   a signal receiving component configured to receive the protecting signal sent out by the wind speed detecting module; and
   a controller connected to the signal receiving component and configured to control the window cleaning robot body to return to the default security area when the signal receiving component receives the protecting signal.

7. The window cleaning robot according to claim 6, wherein the signal transmitting component comprises a first wireless communication unit, and the signal receiving component comprises a second wireless communication unit which communicates with the first wireless communication unit.

8. The window cleaning robot according to claim 7, wherein the first wireless communication unit is an infrared transmitter and the second wireless communication unit is an infrared receiver.

9. A window cleaning robot comprising:
   a window cleaning robot body;
   a temperature detecting device, disposed on the window cleaning robot body and configured to detect a temperature outside the window cleaning robot body; and
   a controlling device, connected to the temperature detecting device and configured to control an action of the window cleaning robot body based on a data detected by the temperature detecting device,
   wherein the temperature detecting device comprises a probe configured to detect the temperature outside the window cleaning robot body, and at least a part of the probe is outside the window cleaning robot body; and
   wherein the window cleaning robot body is provided with a mounting slot on a bottom wall thereof, the mounting slot is provided with a supporting rib on a top wall thereof and the probe is supported on the supporting rib.

10. The window cleaning robot according to claim 9, wherein the controlling device is disposed within the window cleaning robot body, and the temperature detecting device comprises:
    a conducting wire having one end connected to the probe and the other end connected to the controlling device.

11. The window cleaning robot according to claim 10, wherein the probe is mounted within the mounting slot, one end of the conducting wire is disposed within the mounting slot and connected to the probe, and the other end of the conducting wire passes through the mounting slot and is connected to the controlling device.

12. The window cleaning robot according to claim 11, wherein the temperature detecting device is fixed within the mounting slot by means of a fixing component.

13. The window cleaning robot according to claim 12, wherein the fixing component comprises:
- a fixed cover comprising a receiving portion and a connecting portion which are connected with each other, and
- a fastener configured to fasten the connecting portion to the mounting slot,
- wherein the probe is accommodated between the receiving portion and a top wall of the mounting slot.

14. The window cleaning robot according to claim 13, wherein the receiving portion is configured to be semicylindrical, and there are two connecting portions which are connected to the receiving portion on both sides in a radial direction respectively.

15. The window cleaning robot according to claim 9, wherein the supporting rib is formed with a positioning slot, and a part of the probe is accommodated and positioned within the positioning slot.

16. The window cleaning robot according to claim 9, wherein there are a plurality of supporting ribs, and the plurality of supporting ribs are spaced apart in a length direction of the probe so as to support the probe respectively.

17. A method for controlling a window cleaning robot, the window cleaning robot comprising a detecting module and a controlling device, the method comprising the following steps:
- detecting an environment outside the window cleaning robot body by the detecting module; and
- controlling the window cleaning robot by the controlling device to execute a safety controlling strategy so as to return to the default security area based on a data detected by the detecting module,
- wherein the detecting module is a wind speed detecting module for detecting outdoor wind force,
- wherein the window cleaning robot further comprises a power adapter for converting an alternating current into a direct current so as to supply power to the window cleaning robot body, and the wind speed detecting module is connected in series between the window cleaning robot body and the power adapter.

* * * * *